(12) United States Patent
Chauhan et al.

(10) Patent No.: US 10,849,179 B1
(45) Date of Patent: Nov. 24, 2020

(54) MOBILE NETWORK TOOL

(71) Applicant: Bank of America Corporation, Charlotte, NC (US)

(72) Inventors: Sandeep Kumar Chauhan, Hyderabad (IN); Sarat Kumar Magatapalli, Hyderabad (IN); Sudarshan Veeramreddy, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 70 days.

(21) Appl. No.: 16/424,909

(22) Filed: May 29, 2019

(51) Int. Cl.
*H04W 76/15* (2018.01)
*H04W 76/14* (2018.01)

(52) U.S. Cl.
CPC .......... *H04W 76/15* (2018.02); *H04W 76/14* (2018.02)

(58) Field of Classification Search
CPC .............................. H04W 76/15; H04W 76/14
See application file for complete search history.

(56) References Cited

U.S. PATENT DOCUMENTS

| | | | |
|---|---|---|---|
| 6,845,248 B1 | 1/2005 | Johnson | |
| 7,231,449 B2 | 6/2007 | Ellison | |
| 7,464,174 B1 | 12/2008 | Ngai | |
| 7,562,136 B2 | 7/2009 | Bush, III | |
| 7,664,861 B2 | 2/2010 | Guntupalli et al. | |
| 7,787,362 B2 | 8/2010 | Xu | |
| 7,847,728 B2 | 12/2010 | Thomson | |
| 7,895,013 B2 | 2/2011 | Dietz | |
| 7,953,440 B2 | 5/2011 | Nagata | |
| 8,036,725 B2 | 10/2011 | Araki | |
| 8,144,594 B2 | 3/2012 | Woundy | |
| 8,213,409 B2 * | 7/2012 | Rudnick | H04L 45/52 370/351 |
| 8,310,537 B2 | 11/2012 | Marti | |
| 8,326,353 B1 | 12/2012 | Nasserbakht | |
| 8,635,092 B2 | 1/2014 | Wooldridge | |
| 8,953,490 B2 | 2/2015 | Montemurro et al. | |
| 8,972,297 B2 | 3/2015 | Kay et al. | |
| 9,021,026 B2 | 4/2015 | Hopkins et al. | |
| 9,078,135 B2 | 7/2015 | Bravo | |
| 9,084,081 B2 | 7/2015 | Gupta | |
| 9,100,966 B2 | 8/2015 | Nousiainen | |
| 9,185,525 B2 | 11/2015 | Dietz | |
| 9,317,183 B2 | 4/2016 | Kim | |
| 9,455,886 B2 | 9/2016 | Qureshi | |

(Continued)

*Primary Examiner* — Ajay Cattungal
(74) *Attorney, Agent, or Firm* — Michael A. Springs

(57) ABSTRACT

A device includes a memory, a transceiver, and a processor. The processor receives a request (including a first identifier assigned to a first mobile device) from the first mobile device. In response, the processor determines that a server connection is unavailable, adds a second identifier to the request, and broadcasts the request. The processor then receives a first path (including the first and second identifiers along with a third identifier assigned to a second mobile device) from the second mobile device and sends it to the first mobile device. The processor then receives a first piece of data and a second path (including the first and second identifiers along with a fourth identifier assigned to a third mobile device) from the first mobile device. In response, the processor identifies the third mobile device and sends the first piece of data and the second path to the third mobile device.

20 Claims, 11 Drawing Sheets

(56) References Cited

U.S. PATENT DOCUMENTS

| | | |
|---|---|---|
| 9,462,965 B2 | 10/2016 | Stanley-Marbell |
| 9,482,737 B2 | 11/2016 | Bahl |
| 9,504,055 B1 | 11/2016 | Sanka |
| 9,510,196 B2 | 11/2016 | Sensharma |
| 9,531,844 B2 | 12/2016 | Zhou |
| 9,742,656 B2 * | 8/2017 | Zheng .................. H04L 45/64 |
| 9,749,864 B2 | 8/2017 | Deng |
| 9,780,436 B2 | 10/2017 | Lai |
| 10,171,992 B1 | 1/2019 | Viswanathan et al. |
| 2004/0014467 A1 * | 1/2004 | O'Neill .................. H04W 8/087 |
| | | 455/422.1 |
| 2004/0125795 A1 * | 7/2004 | Corson .................. H04L 29/06 |
| | | 370/356 |
| 2004/0198395 A1 * | 10/2004 | Kimoto .................. H04L 67/18 |
| | | 455/456.1 |
| 2005/0157697 A1 * | 7/2005 | Lee ...................... H04L 45/302 |
| | | 370/349 |
| 2006/0101157 A1 * | 5/2006 | Eardley .................. H04L 45/24 |
| | | 709/239 |
| 2007/0110024 A1 * | 5/2007 | Meier .................... H04L 45/48 |
| | | 370/351 |
| 2008/0159195 A1 | 7/2008 | Kappler |
| 2008/0186907 A1 * | 8/2008 | Yagyuu ................. H04W 40/30 |
| | | 370/328 |
| 2009/0249247 A1 | 1/2009 | Tseng |
| 2010/0045796 A1 | 2/2010 | Fraley |
| 2010/0174756 A1 | 3/2010 | Lazaridis |
| 2012/0079111 A1 | 3/2012 | Luukkala |
| 2012/0096132 A1 | 4/2012 | Lim |
| 2012/0182867 A1 * | 7/2012 | Farrag ............... H04W 28/0236 |
| | | 370/230 |
| 2013/0227647 A1 | 2/2013 | Thomas |
| 2013/0057927 A1 | 3/2013 | Durant |
| 2013/0290701 A1 * | 10/2013 | Takenaka .......... H04W 12/0013 |
| | | 713/153 |
| 2013/0346494 A1 | 12/2013 | Nakfour et al. |
| 2014/0094180 A1 * | 4/2014 | Zhou .................... H04W 76/14 |
| | | 455/445 |
| 2014/0157355 A1 | 6/2014 | Clancy |
| 2015/0113658 A1 | 4/2015 | Zhong et al. |
| 2015/0327072 A1 | 5/2015 | Powell |
| 2015/0295808 A1 * | 10/2015 | O'Malley ............... H04L 47/22 |
| | | 709/224 |
| 2016/0044151 A1 | 2/2016 | Shoemaker |
| 2016/0269992 A1 | 9/2016 | Kyllonen |
| 2017/0034253 A1 | 2/2017 | Jiang |

\* cited by examiner

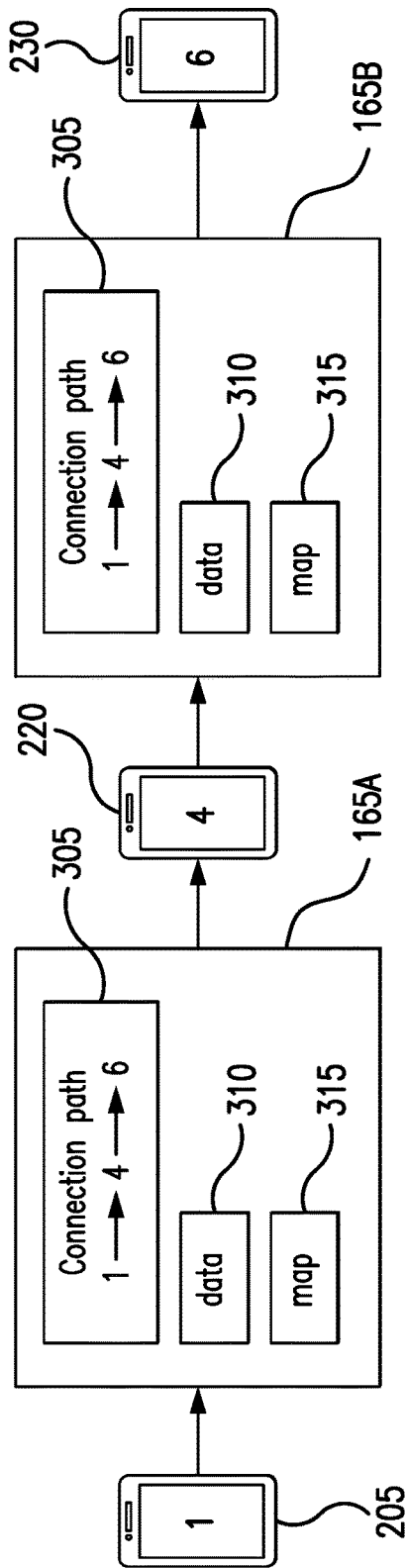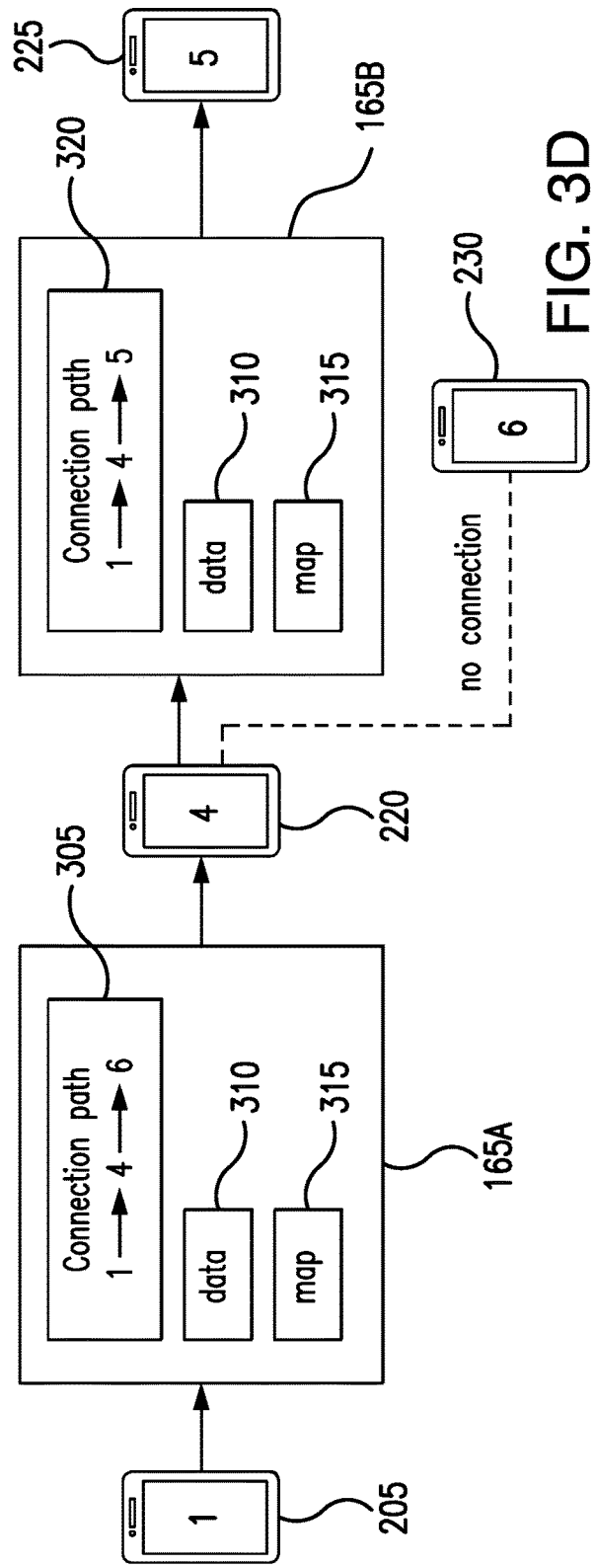

US 10,849,179 B1

MOBILE NETWORK TOOL

TECHNICAL FIELD

This disclosure relates generally to accessing the internet using a mobile device.

BACKGROUND

More than two-thirds of American households access the internet on mobile devices, according to a U.S. Census Bureau report released in 2018. To take advantage of mobile device use, enterprises frequently offer their customers/users software applications tailored for such use. When connected over a Wi-Fi or cellular data network, customers/users can easily use these applications to engage in a variety of interactions with the enterprises.

SUMMARY

More than two-thirds of American households access the internet on mobile devices, according to a U.S. Census Bureau report released in 2018. To take advantage of mobile device use, enterprises frequently offer their customers/users software applications tailored for such use. When connected over a Wi-Fi or cellular data network, customers/users can easily use these applications to engage in a variety of interactions with the enterprises.

However, if a user's mobile device is outside the range of a Wi-Fi router or an available cellular data network, data exchange between the device and the enterprise may not be possible. As a result, situations may develop in which a user attempting to engage in a transaction with an enterprise (or perhaps worse, a user in the midst of a transaction with an enterprise) loses its connection to the Internet and is unable to complete the transaction.

This disclosure contemplates a mobile network tool that addresses one or more of the above issues. This tool enables a collection of mobile devices to cooperate with one another to establish a connection between a mobile device seeking to connect to an enterprise server and the server, when the mobile device is unable to directly connect to the server over a centralized network. The tool accomplishes this by enabling the collection of mobile devices to transfer data amongst one another over a communication channel that does not require a connection to the centralized network. In such a manner, a mobile device that is unable to connect to an enterprise server over the network, can establish such a connection by sending a connection request through a mesh of cooperating mobile devices, terminating at one or more mobile devices that are able to establish the connection to the network. This initial connect request behaves like a ping service, providing the mobile device seeking to establish the connection to the server with one or more available connection paths. The mobile device can then choose an optimal connection path, over which data transfer takes the least amount of time, and use this optimal path to send and receive data to/from the server. Certain embodiments of the mobile network tool are described below.

According to one embodiment, device includes a memory, a transceiver, and a hardware processor communicatively coupled to the memory. The processor uses the transceiver to receive a first connection request broadcasted from a first mobile device. The first connection request includes a first identifier assigned to the first mobile device. In response to receiving the first connection request, the processor determines that a network connection to a server is not available. In response to determining that the network connection to the server is not available, the processor adds a second identifier to the first connection request. The processor also uses the transceiver to broadcast the first connection request for receipt by at least one mobile device. In response to broadcasting the first connection request, the processor uses the transceiver to receive a first connection path from a second mobile device. The first connection path includes the first identifier, the second identifier, and a third identifier assigned to the second mobile device. The processor further uses the transceiver to send the first connection path to the first mobile device. The processor also uses the transceiver to receive a first piece of data and a second connection path from the first mobile device. The second connection path includes the first identifier, the second identifier, and a fourth identifier assigned to a third mobile device. In response to receiving the first piece of data and the second connection path the processor identifies the third mobile device, based on the second connection path and the fourth identifier. The processor further uses the transceiver to send the first piece of data and the second connection path to the third mobile device.

According to another embodiment, a method includes using a transceiver to receive a first connection request broadcasted from a first mobile device. The first connection request includes a first identifier assigned to the first mobile device. In response to receiving the first connection request, the method further includes determining that a network connection to a server is not available. In response to determining that the network connection to the server is not available, the method also includes adding a second identifier to the first connection request. The method further includes using the transceiver to broadcast the first connection request for receipt by at least one mobile device. In response to broadcasting the first connection request, the method additionally includes using the transceiver to receive a first connection path from a second mobile device. The first connection path includes the first identifier, the second identifier, and a third identifier assigned to the second mobile device. The method also includes using the transceiver to send the first connection path to the first mobile device. The method further includes using the transceiver to receive a first piece of data and a second connection path from the first mobile device. The second connection path includes the first identifier, the second identifier, and a fourth identifier assigned to a third mobile device. In response to receiving the first piece of data and the second connection path, the method also includes identifying the third mobile device, based on the second connection path and the fourth identifier. In method further includes using the transceiver to send the first piece of data and the second connection path to the third mobile device.

According to a further embodiment, a system includes a storage element, a transceiver, and a processing element communicatively coupled to the memory. The processing element is operable to use the transceiver to receive a first connection request broadcasted from a first mobile device. The first connection request includes a first identifier assigned to the first mobile device. In response to receiving the first connection request, the processing element is further operable to determine that a network connection to a server is not available. In response to determining that the network connection to the server is not available, the processing element is additionally operable to add a second identifier to the first connection request. The processing element is also operable to use the transceiver to broadcast the first connection request for receipt by at least one mobile device. In response to broadcasting the first connection request, the processing element is further operable to use the transceiver to receive a first connection path from a second mobile device. The first connection path includes the first identifier, the second identifier, and a third identifier assigned to the second mobile device. The processing element is additionally operable to use the transceiver to send the first connection path to the first mobile device. The processing element is also operable to use the transceiver to receive a first piece of data and a second connection path from the first mobile device. The second connection path includes the first identifier, the second identifier, and a fourth identifier assigned to a third mobile device. In response to receiving the first piece of data and the second connection path the processing element is further operable to identify the third mobile device, based on the second connection path and the fourth identifier. The processing element is additionally operable to use the transceiver to send the first piece of data and the second connection path to the third mobile device.

Certain embodiments provide one or more technical advantages. For example, an embodiment enables a user of a mobile device to exchange data with a server, even though the mobile device itself is unable to directly connect to the server over a network. As another example, an embodiment enables a user to complete a transaction with an enterprise server that the user initiated on a mobile device that was initially connected to a Wi-Fi or cellular network, when the mobile device loses the Wi-Fi or cellular network connection and is unable to directly connect to the server part way through the transaction. As a further example, an embodiment provides a mobile device access to a network over the most optimal connection path available, enabling a user of the mobile device to send/receive data to/from a server in the least possible time. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 3A through 3D provide examples of the type of information sent and received by a mobile device in the mesh of mobile devices illustrated in FIG. 2A;

DETAILED DESCRIPTION

Embodiments of the present disclosure and its advantages are best understood by referring to FIGS. 1 through 8 of the drawings, like numerals being used for like and corresponding parts of the various drawings.

More than two-thirds of American households access the internet on mobile devices, according to a U.S. Census Bureau report released in 2018. To take advantage of mobile device use, enterprises frequently offer their customers/users software applications tailored for such use. When connected over a Wi-Fi or cellular data network, customers/users can easily use these applications to engage in a variety of interactions with the enterprises.

However, if a user's mobile device is outside the range of a Wi-Fi router or an available cellular data network, data exchange between the device and the enterprise may not be possible. As a result, situations may develop in which a user attempting to engage in a transaction with an enterprise (or perhaps worse, a user in the midst of a transaction with an enterprise) loses its connection to the Internet and is unable to complete the transaction.

This disclosure contemplates a mobile network tool that addresses one or more of the above issues. This tool enables a collection of mobile devices to cooperate with one another to establish a connection between a mobile device seeking to connect to an enterprise server and the server, when the mobile device is unable to directly connect to the server over a network. The tool accomplishes this by enabling the collection of mobile devices to transfer data amongst one another over a communication channel that does not require a connection to the network. In such a manner, a mobile device that is unable to connect to an enterprise server over the network, can establish such a connection by sending a connection request through a mesh of cooperating mobile devices, terminating at one or more mobile devices that are able to establish the connection to the network. This initial connect request behaves like a ping service, providing the mobile device seeking to establish the connection to the server with one or more available connection paths. The mobile device can then choose an optimal connection path, over which data transfer to/from the server should take the least amount of time, and use this optimal path to send/receive data to/from the server. The mobile network tool will be described in more detail using FIGS. 1 through 8.

Figure 1:
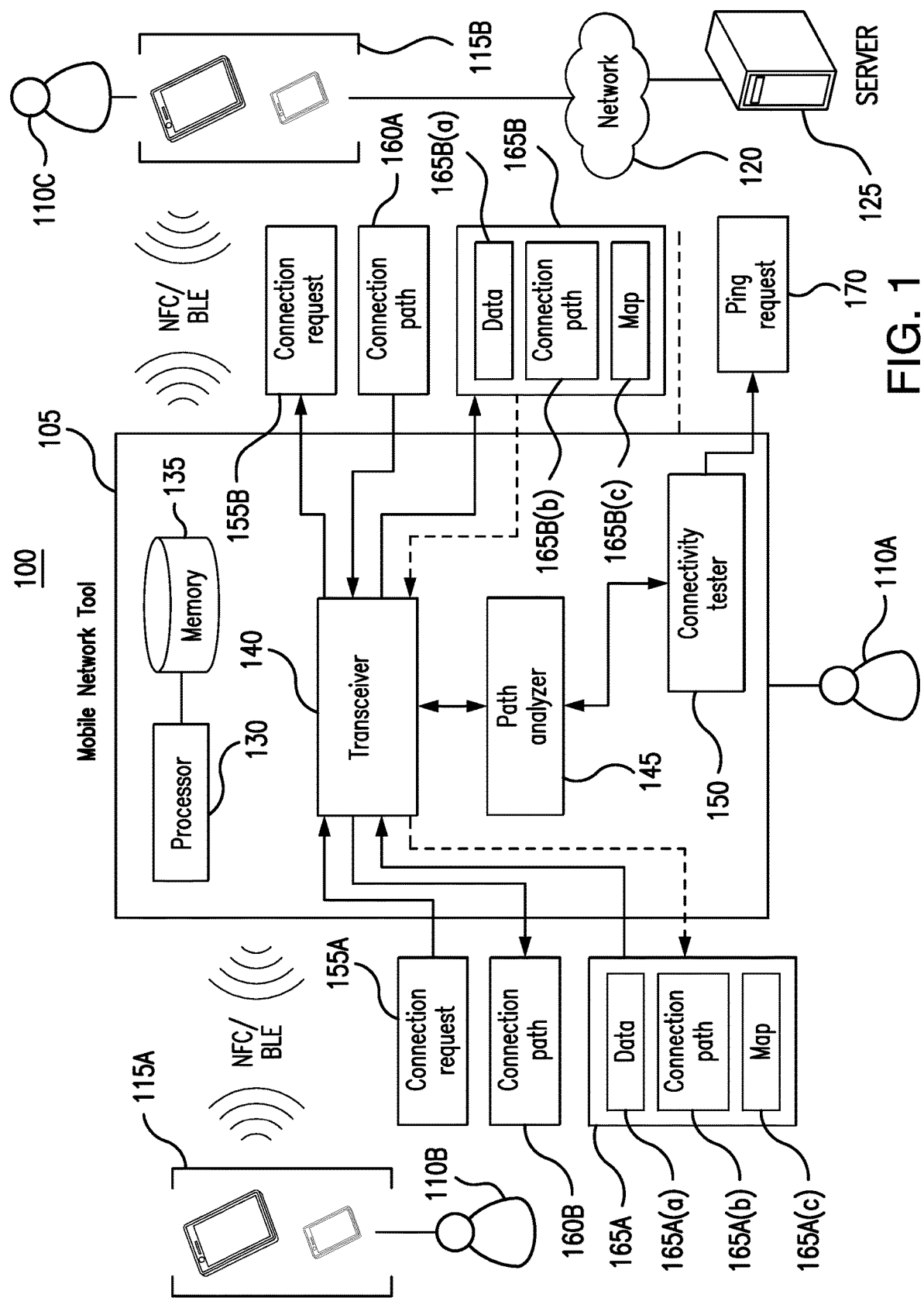
FIG. 1 illustrates an example system.

FIG. 1 illustrates an example system 100. As seen in FIG. 1, system 100 includes mobile network tool 105, one or more mobile devices 115A from which mobile network tool 105 receives information, one or more mobile devices 115B to which mobile network tool 105 sends information, network 120, and one or more servers 125. Generally, mobile network tool 105 facilitates the transfer of data between a mobile device 115A that is unable to connect to network 120 and a server 125, by enabling other mobile devices near mobile device 115A to provide a connection path to server 125 over which mobile device 115A can send and receive data. For example, as illustrated in FIG. 1 for a system containing three mobile devices only one of which is able to connect to network 120, mobile network tool 105 operates as follows: mobile network tool 105 receives a connection request 155A from mobile device 115A, which is unable to connect to network 120. Mobile network tool 105 then determines that it is not able to connect directly to network 120 and as a result, broadcasts connection request 155B, for receipt by other mobile devices, over a communication channel that does not require a connection to network 120. Mobile device 115B, which is able to connect to network 120, receives this connection request 155B, and communicates back to mobile device 115A, through the chain of mobile devices, that a connection to server 125 over network 120 is available. Mobile device 115A can then send and receive data to/from server 125 using this chain of connected devices.

Mobile network tool 105 may be implemented in any type of electronic device, which user 110A may carry on his or her person. Mobile network tool 105 may similarly be implemented on mobile devices 115A and 115B, which users 110B and 110C carry on their persons. Mobile devices 115A and 115B are used to send information to mobile network tool 105 and receive information from mobile network tool 105 over a communication channel that does not require a connection to network 120. For example, this disclosure contemplates that mobile devices 115A and 115B can send information to mobile network tool 105 and receive information from mobile network tool 105 using near field communication (NFC), Bluetooth Low Energy (BLE), or any other appropriate communication means that does not require a connection to network 120. As an example, a user 110B may attempt to connect to server 125 using mobile device 115A. Mobile device 115A may determine that a connection to server 125 over network 120 is unavailable. As a result, mobile device 115A broadcasts a connection request 155A using NFC, BLE, or any other appropriate communication means, for receipt by nearby mobile devices. Mobile network tool 105, operating on a mobile device belonging to user 110A, receives the request. Mobile network tool 105 similarly determines that it is unable to connect to server 125 over network 120 and, as a result, broadcasts connection request 155B. Mobile device 115B, belonging to user 110C, receives connection request 155B and determines that it is able to connect to server 125 over network 120, thereby setting up a connection path between mobile device 115A and server 125, where the connection path consists of three mobile devices belonging to three different users.

Mobile devices 115A and 115B include any appropriate device for communicating with components of system 100 over NFC, BLE, or any other appropriate communication means that does not require a connection to network 120— when a connection to network 120 is not available—or over network 120—when a connection to network 120 is available. For example, and not by way of limitation, mobile devices 115A and 115B may be mobile phones, laptops, tablets, automated assistants, and/or any other type of electronic devices that users 110B and 110C may carry on their persons, capable of receiving, processing, storing, and/or communicating information with other components of system 100. Mobile devices 115A and 115B may also include user interfaces, such as a display, a microphone, keyboard, or other appropriate terminal equipment usable by users 110B and 110C. In some embodiments, an application executed by mobile devices 115A and 115B may perform the functions described herein.

Network 120 facilitates communication with server 125. For example, as illustrated in FIG. 1, network 120 facilitates communication between mobile device 115B and server 125, when mobile device 115B is able to connect to network 120 (for example, when mobile device 115B is within range of a Wi-Fi router or a cellular data network). This disclosure contemplates network 120 being any suitable network operable to facilitate communication between components of system 100, when those components are within range of a Wi-Fi or cellular data access point. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components and server 125.

Servers 125 are used by an enterprise or other organization to process requests or transactions, run projects, store data, and/or perform any other operation initiated or submitted to servers 125 by users 110A through 110C. Servers 125 may include application servers, database servers, file servers, mail servers, print servers, web servers, or any other type of server that provides functionality to users 110A through 110C. Mobile device 115B can send information to servers 125 and can receive information from servers 125 when mobile device 115B is able to connect to network 120.

As seen in FIG. 1, mobile network tool 105 includes a processor 130, a memory 135, a transceiver 140, a path analyzer 145, and a connectivity tester 150. This disclosure contemplates processor 130 and memory 140 being configured to perform any of the functions of mobile network tool 105 described herein. Generally, mobile network tool 105 implements connectivity tester 150 to determine whether a connection to server 125 over network 120 is available and path analyzer 145 to add an identifier assigned to mobile network tool 105 to a connection request and/or to determine to which mobile device—illustrated here as 115A and 115B—if any, transceiver 140 should send data.

In certain embodiments, connectivity tester 150 determines whether a connection to server 125 over network 120 is available by sending a ping request 170 to server 125 and waiting for a reply. If connectivity tester 150 does not receive a reply within a set period of time, connectivity tester 150 determines that a connection to server 125 over network 120 is not available.

Connectivity tester 150 may be a software module stored in memory 135, executed by processor 130, and used in conjunction with a Wi-Fi or cellular enabled transceiver 140. An example algorithm for connectivity tester 150 is as follows: instruct a Wi-Fi or cellular enabled transceiver 140 to send a ping request 170; determine whether the Wi-Fi or cellular enabled transceiver 140 received a reply within a set period of time; if the Wi-Fi or cellular enabled transceiver 140 received a reply within the set period of time, send a message to path analyzer 145 indicating that a connection to server 125 over network 120 is available; if the Wi-Fi or cellular enabled transceiver 140 did not receive a reply within the set period of time, send a message to path analyzer 145 indicating that a connection to server 125 over network 120 is not available.

Path analyzer 145 works in combination with transceiver 140 to determine where transceiver 140 should send data that mobile network tool 105 receives from mobile devices 115A and 115B. In the example situation illustrated in FIG. 1, mobile network tool 105 is a device in the middle of a chain of devices used to establish a connection between mobile device 115A and server 125. However, this disclosure contemplates that mobile network device 105 may also be the first device in a chain of devices, requesting a connection to server 120, or the terminating device in a chain of devices, connecting to server 125 over network 120.

When mobile network tool 105 receives a connection request 155A from mobile device 115A (indicating that mobile device 115A wishes to connect to server 125 but is unable to access network 120), path analyzer 145 adds an identifier assigned to mobile network tool 105 to connection request 155A and instructs connectivity tester 150 to determine whether a connection to server 125 over network 120 is available. If such a connection is unavailable (as is illustrated in FIG. 1), path analyzer 145 instructs transceiver 140 to broadcast connection request 155B for receipt by nearby mobile devices. Here, connection request 155B differs from connection request 155A to the extent that the identifier assigned to mobile network tool 105 is additionally present in connection request 155B. When mobile network tool 105 is the device seeking to connect to server 125, path analyzer 145 will simply instruct transceiver 140 to broadcast a connection request 155B consisting of the identifier assigned to mobile network tool 105.

If connectivity tester 150 determines that a connection to server 125 over network 120 is available, path analyzer 145 converts connection request 155B to a connection path response, where such connection path response contains a sequence of identifiers—starting with the identifier of an originating mobile device, which broadcasted the initial request for a connection to server 125, and terminating with the identifier assigned to mobile network tool 105. This sequence of identifiers indicates the path that connection request 155A took from the originating mobile device to mobile network tool 105.

If mobile network tool 105 is unable to directly connect to server 125 over network 120, but a connection to server 120 is nevertheless available through a chain of devices that includes mobile network tool 105, mobile network tool 105 will additionally receive a connection path response 160A from a mobile device 115B that received connection request 155B. Path analyzer will locate the identifier assigned to mobile network tool 105 in connection path response 160A and further locate an identifier immediately preceding the identifier assigned to mobile network tool 105 in the connection path. This preceding identifier indicates the mobile device 115A from which mobile network tool 105 received connection request 155A. Path analyzer 145 then instructs transceiver 140 to send connection path 160B to mobile device 115A, assigned to the preceding identifier. Here, connection path 160B is the same as connection path 160A.

If mobile network tool 105 is the device that sent the original connection request 155A, transceiver 140 may receive one or more connection path responses which it will pass to path analyzer 145. Path analyzer 145 will use the one or more available connection paths to determine an optimal connection path. In certain embodiments, the optimal connection path is determined to be the path over which mobile network tool 105 can send a piece of data to server 125 in the least amount of time; however, this disclosure contemplates that path analyzer 145 may determine the optimal connection path using a variety of methods, discussed in detail below, in the discussion of FIGS. 2A and 2B.

When mobile network tool 105 is a device in the optimal connection path, mobile network tool 105 will additionally receive packets of information 165 containing data 165(*a*), optimal connection path 165(*b*), and connection map 165(*c*), sent to/from server 125. When a packet of information 165A is bound for server 125, path analyzer 145 will locate the identifier assigned to mobile network tool 105 in optimal connection path 165A(b) and will further locate an identifier immediately following the identifier assigned to mobile network tool 105 in the optimal connection path 165A(b). This following identifier indicates the mobile device 115B to which mobile network tool 105 should send information packet 165B. When a packet of information 165B is bound from server 125 back to originating mobile device 115A, path analyzer 145 will locate the identifier assigned to mobile network tool 105 in optimal connection path 165B(b) and will further locate an identifier immediately preceding the identifier assigned to mobile network tool 105 in the optimal connection path 165B(b). This preceding identifier indicates the mobile device 115A to which mobile network tool 105 should send information packet 165A.

Path analyzer 145 may be a software module stored in memory 135 and executed by processor 130. An example algorithm for path analyzer 145 is as follows: determine if mobile network tool 105 is attempting to connect to server 125 but a connection to network 120 is unavailable; if mobile network tool 105 is attempting to connect to server 125 but a connection to network 120 is unavailable: {create a connection request that includes an identifier assigned to mobile network tool 105; instruct transceiver 140 to broadcast the connection request; receive one or more connection path responses 160B from transceiver 140; determine a connection map 165(*c*) from the one or more connection path responses 160B; determine an optimal connection path 165(*b*) from the one or more connection path responses 160B; determine the second identifier in the optimal connection path 165(*b*); instruct transceiver 140 to send information packet 165 to the mobile device assigned to the second identifier}; determine if transceiver 140 received a connection request 155A from a nearby mobile device 115A; if transceiver 140 received connection request 155A from a nearby mobile device 155A: {add an identifier assigned to mobile network tool 105 to a connection request 155A; instruct connectivity tester 150 to determine if a connection to server 125 over network 120 is available; if a connection to server 125 over network 120 is available: {create a connection path response 160 using connection request 155A; locate the second last identifier in connection path response 160, indicating the mobile device from which mobile network tool 105 received connection request 155A; instruct transceiver 140 to send connection path response 160 to the mobile device assigned to the second last identifier}; if a connection to server 125 over network 120 is not available, instruct transceiver 140 to broadcast the connection request}; determine if transceiver 140 received a connection path response 160A; if transceiver 140 received a connection path response 160A: {locate the identifier assigned to mobile network tool 105 in connection path 160A and determine the preceding identifier in the connection path; instruct transceiver 140 to send connection path response 160B to the mobile device assigned to the preceding identifier}; determine if mobile network tool 105 received an information packet 165A destined for server 125; if mobile network tool 105 received information packet 165A destined for server 125: {instruct connectivity tester 150 to determine if a connection to server 125 over network 120 is available; if a connection to server 125 over network 120 is available, send information packet 165B to server 125; if a connection to server 125 over network 120 is not available: {locate the identifier assigned to mobile network tool 105 in optimal path 165A(b) and determine the following identifier in optimal path 165A(b); instruct transceiver 140 to send information packet 165B to the mobile device assigned to the following identifier} 1; determine if mobile network tool 105 received an information packet 165B destined for a mobile device 115A that initiated connection request 155A; if mobile network tool 105 received information packet 165B destined for mobile device 115A that initiated connection request 155A: {locate the identifier assigned to mobile network tool 105 in optimal path 165B(b) and determine the preceding identifier in optimal path 165B(b); instruct transceiver 140 to send information packet 165A to the mobile device assigned to the preceding identifier}.

In certain embodiments, it is possible that after an optimal connection path 165(b) has been determined, but before information packets 165A or 165B can be sent to and received by their final destinations, a mobile device within the optimal connection path 165(b) may move out of range of the other mobile devices in optimal connection path 165(b), thereby breaking the connection path. For example, mobile device 115B may move out of range of mobile network tool 105. Certain embodiments address this situation in a variety of ways.

For example, in certain embodiments, server 125 may determine that a mobile device 115A that initiated connection request 155A was not able to receive information packet 165 sent by server 125. In certain embodiments, server 125 may determine that mobile device 115A was unable to receive information packet 165 by requesting that mobile device 115A send a confirmation response to server 125 (along optimal connection path 165(b)) when mobile device 115A receives information packet 165, and then failing to receive such a confirmation response. In response to determining that mobile device 115A has not received information packet 165, server 125 may use map 165(c) to determine that an alternative connection path to mobile device 115A is available. Server 125 may then attempt to send information packet 165 to mobile device 115A through the alternative connection path. In certain embodiments, if server 125 determines that no alternative connection path is available, server 125 may store information packet 165 in a queue and wait to resend such information until server 125 determines that an alternative connection path is available.

As another example, in certain embodiments, mobile network tool 105 may determine that a mobile device 115A or 115B, to which mobile network tool 105 sent information packet 165, did not receive information packet 165. In response, path analyzer 145 of mobile network tool 105 may use map 165(c) to determine an alternative connection path that does not include the identifier assigned to the mobile device that did not receive information packet 165. If path analyzer 145 determines that such an alternative connection path exists, it can replace connection path 165(b) in information packet 165 with this alternative connection path and then instruct transceiver 140 to send information packet 165 using such path.

In certain embodiments, mobile network tool 105 additionally implements an encryption component. Generally, mobile network tool 105 may implement the encryption component in situations in which mobile network tool 105 is the device that initiates connection request 155A, seeking a connection to server 125 over network 120. In such situations, once a connection path is established between mobile network tool 105 and server 125, mobile data tool 105 uses the encryption component to encrypt the data 165(a) that it sends to other mobile devices for ultimate receipt by server 125 and to decrypt data 165(a) that it receives from server 125 through other mobile devices. For example, server 125 may store an encryption key for each mobile device in the communication mesh, where server 125 may determine the encryption key assigned to each mobile device from the identifier assigned to the mobile device. Each mobile network tool 105 will similarly store the encryption key assigned to it. In this manner, a user 110 of mobile network tool 105 may send/receive confidential information to/from server 125 through a mesh of mobile devices while limiting the risk that a device in the mesh (or outside of the mesh) is able to obtain the user's confidential information.

Processor 130 is any electronic circuitry, including, but not limited to microprocessors, application specific integrated circuits (ASIC), application specific instruction set processor (ASIP), and/or state machines, that communicatively couples to memory 135 and controls the operation of mobile network tool 105. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of mobile network tool 105 by processing information received from network 120, mobile devices 115A and 115B, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Transceiver 140 is a microprocessor designed to process incoming signals and to transmit signals. Transceiver 140 may contain an antenna to send and receive these signals. This disclosure contemplates that mobile network tool 105 may have one or more transceivers 140, capable of communicating over different networks. For example, transceiver 140 may be a Bluetooth transceiver for communicating with a Bluetooth enabled device, an NFC transceiver for communicating with an NFC enabled device, or any other suitable transceiver for communicating with a device over a communication channel that does not require a connection to network 120. Additionally, mobile network tool 105 may contain a Wi-Fi transceiver for communicating with a Wi-Fi network when mobile network tool 105 is within range of a Wi-Fi access point, and/or a cellular transceiver for communicating with a cellular base station when mobile network tool 105 is within range of the base station. Mobile network tool 105 may use the Wi-Fi transceiver and/or the cellular transceiver to send/receive data to/from server 125 when connectivity tester 150 determines that a connection to server 125 over network 120 is available.

In certain embodiments, mobile network tool 105 enables a collection of mobile devices—including mobile devices 115A and 115B—to cooperate with one another to establish a connection between a mobile device 115A seeking to connect to server 125 and the server, when mobile device 115A is unable to directly connect to server 125 over network 120. The tool accomplishes this by enabling the collection of mobile devices to transfer data amongst one another over a communication channel that does not require a connection to network 120. For example, mobile devices 115A, 115B, and mobile network tool 105 may communicate amongst one another using NFC, BLE, or any other appropriate communication channel. In such a manner, a mobile device 115A that is unable to connect to server 125 over the network 120, can establish such a connection by sending a connection request 155A through a mesh of cooperating mobile devices, terminating at one or more mobile devices 115B that are able to establish the connection to network 120. This initial connection request 155A behaves like a ping service, providing mobile device 115A with one or more available connection paths 160B. Mobile device 115A can then choose an optimal connection path 165(*b*) and use this optimal path to send/receive data to/from server 125.

Figure 2A:
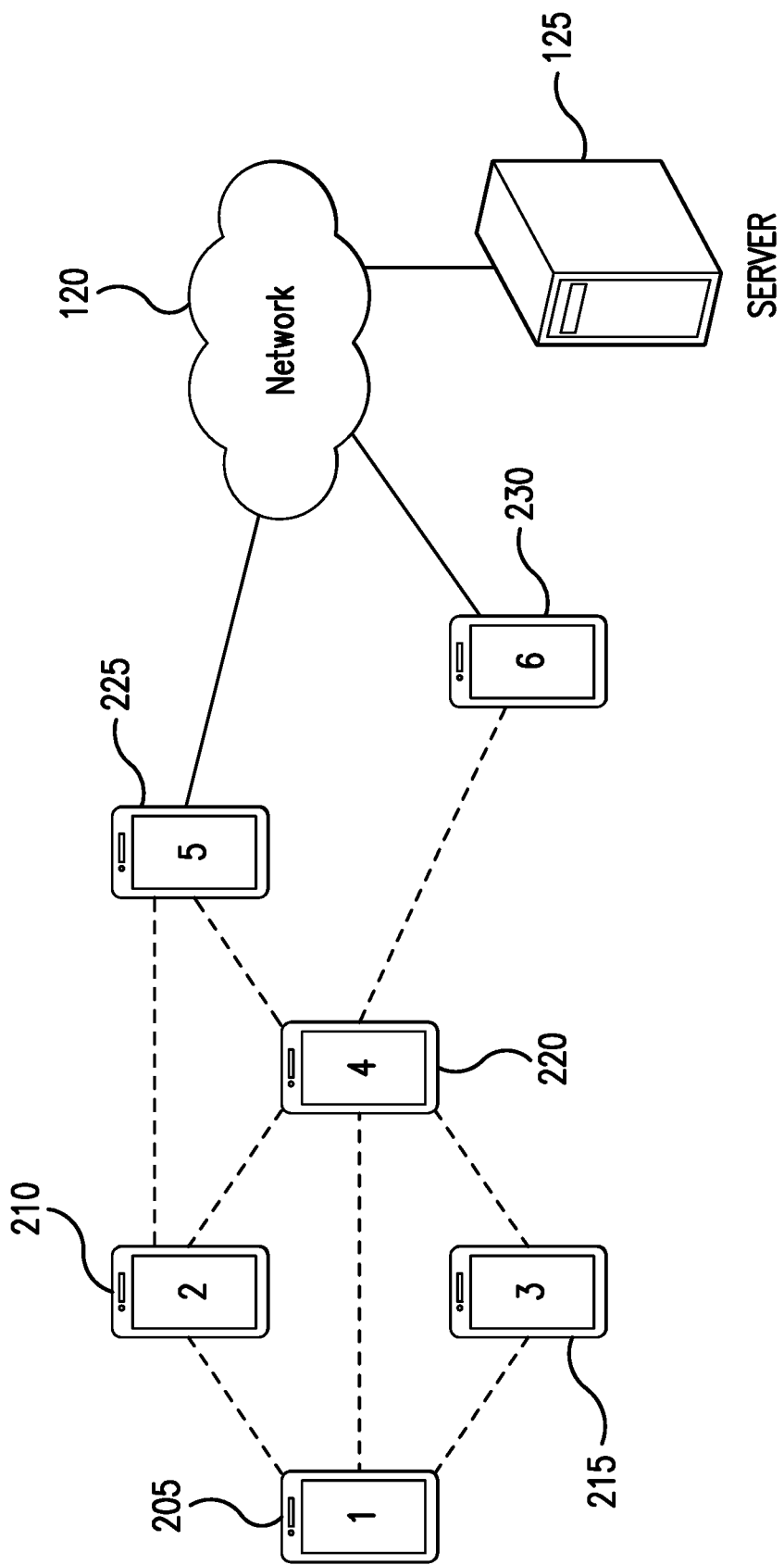
FIGS. 2A and 2B illustrate an example embodiment of the system of FIG. 1, in which a mesh of six mobile devices creates seven different communication paths to a network.
Figure 2B:
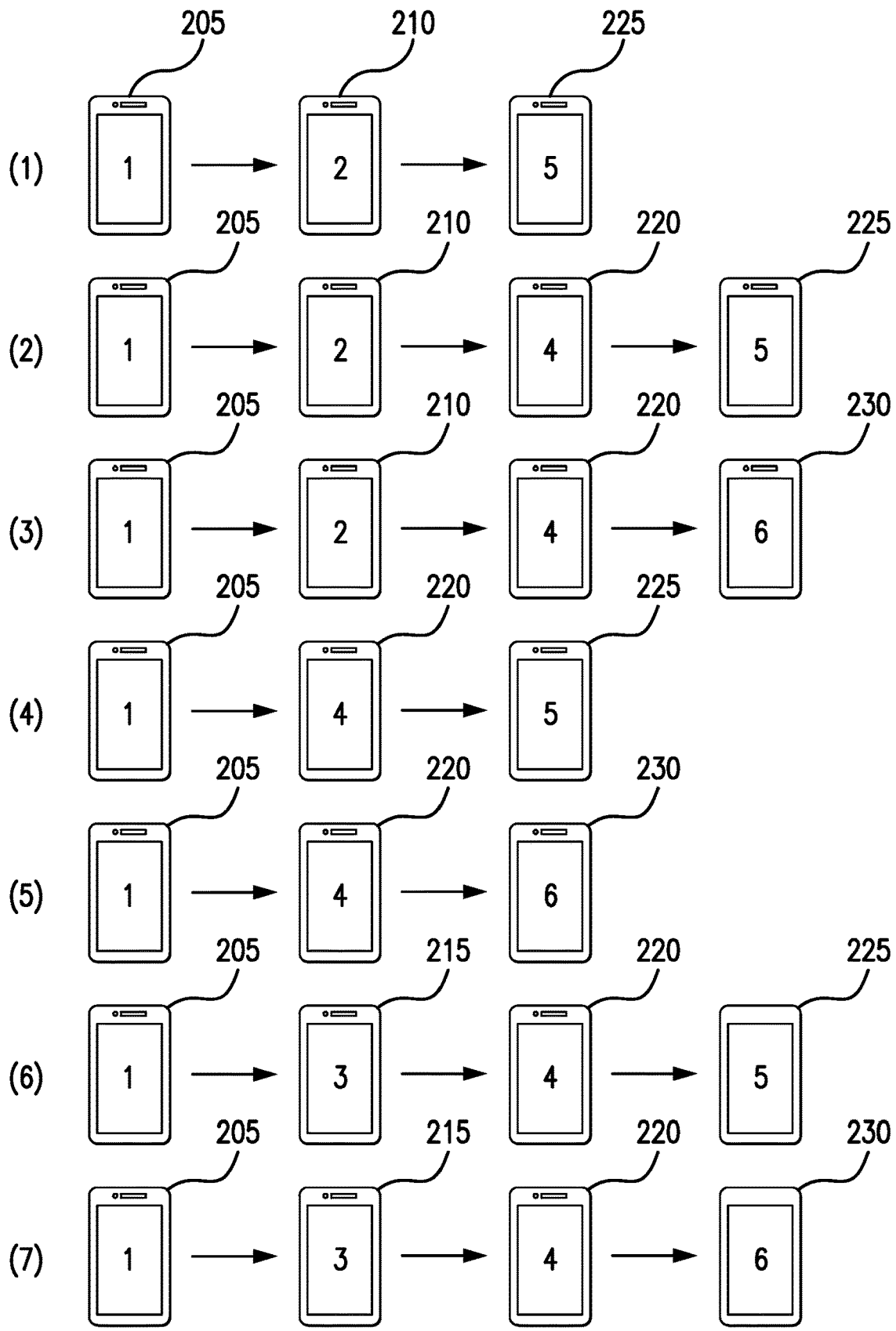

FIGS. 2A and 2B illustrate an example embodiment of system 100 that includes a collection of six mobile devices—first mobile device 205, second mobile device 210, third mobile device 215, fourth device 220, fifth mobile device 225, and sixth mobile device 230—as well as network 120 and server 125. Each of the six mobile devices contains mobile network tool 105. While FIGS. 2A and 2B illustrate a collection of six mobile devices and one server, this is merely for ease of illustration; this disclosure contemplates that any number of mobile devices may be present in the system along with any number of servers 125.

FIG. 2A illustrates a mesh of mobile devices that is used to transfer information between first mobile device 205, which is unable to connect directly to server 125, and server 125. In this figure, dashed lines between mobile devices indicate that an NFC or BLE connection is available between the devices, while solid lines between mobile devices and network 120 indicate that the mobile devices are able to connect directly to network 120.

As can be seen from FIG. 2A, multiple paths exist between first mobile device 205 and server 125. FIG. 2B illustrates these possible paths. As can be seen in FIG. 2B, seven different paths are possible. For example, a first path runs from first mobile device 205 to second mobile device 210 and finally to fifth mobile device 225, which is able to connect to server 125 over network 120. A second possible path runs from first mobile device 205 to second mobile device 210 to fourth mobile device 220 and finally to fifth mobile device 225, which, again, is able to connect to server 125 over network 120. A third possible path runs from first mobile device 205 to second mobile device 210 to fourth mobile device 220 and finally to sixth mobile device 230, which is able to connect to server 125 over network 120. A fourth possible path runs from first mobile device 205 to fourth mobile device 220 and finally to fifth mobile device 225, which, again, is able to connect to server 125 over network 120. A fifth possible path runs from first mobile device 205 to fourth mobile device 220 and finally to sixth mobile device 230, which is able to connect to server 125 over network 120. A sixth possible path runs from first mobile device 205 to third mobile device 215 to fourth mobile device 220 and finally to fifth mobile device 225, which is able to connect to server 125 over network 120. Finally, a seventh possible path runs from first mobile device 205 to third mobile device 215 to fourth mobile device 220 and finally to sixth mobile device 230, which is able to connect to server 125 over network 120.

When multiple possible communication paths are available between a first mobile device 205 and a server 125, mobile network tool 105 and server 125 must decide along which paths to send and receive data. In certain embodiments, the communication path chosen for sending and receiving data between first mobile device 205 and server 125 is chosen by mobile network tool 105 at random. In certain such embodiments, the same communication path is used for the entire interaction between first mobile device 205 and server 125. In other such embodiments, a new random communication path is chosen for each transfer of data between first mobile device 205 and server 125. For example, first mobile device 205 may send a first piece of data to server 125 along the first possible communication path, illustrated in FIG. 2B, from first mobile device 205 to second mobile device 210, to fifth mobile device 225, which is able to send the first piece of data to server 125. In response to receiving this first piece of data, server 125 may send a second piece of data back to first mobile device 205 along the sixth possible communication path, illustrated in FIG. 2B, from server 125 to fifth mobile device 225 to fourth mobile device 220 to third mobile device, which is able to send the second piece of data to first mobile device 205.

In further embodiments, system 100 may use all available communication paths to send data between first mobile device 205 and server 125. This may be desirable to help ensure that data sent by first mobile device 205 is received by server 125 and data sent by server 125 is received by first mobile device 205, in situations where communication paths frequently break due to movement of the users of the mobile devices, that move certain of the devices out of range of the other devices.

In further embodiments, mobile network tool 105 may choose an optimal connection path from all available connection paths, where the optimal connection path is the path by which mobile device 205 can send/receive data to/from server 125 in the least amount of time. In certain embodiments, mobile network tool 105 determines the optimal connection path based on the number of mobile devices contained in the available connection paths, the distances between each of the mobile devices in the available connection paths, and/or the distances between the mobile devices and the server in the available connection paths. This is discussed in further detail below, in the discussion of FIG. 4.

This disclosure contemplates that establishing the connection mesh illustrated in FIG. 2A proceeds as follows. First, first mobile device 205 broadcasts a connection request which is received by second mobile device 210, fourth mobile device 220, and third mobile device 215, given that all of these devices are within range to receive an NFC or BLE transmission from first mobile device 205. These mobile devices then will each determine whether they are able to connect to server 125 over network 120. As illustrated, none of second mobile device 210, third mobile device 215, or fourth mobile device 220 have such connections. Therefore, each of the second mobile device 210, the third mobile device 215, and the fourth mobile device 220 add an identifier assigned to the particular device to the connection request received from first mobile device 205. This ensures that a record of the path by which the connection request travels is maintained. Second mobile device 210, third mobile device 215, and fourth mobile device 220 then broadcast the connection request for receipt by additional mobile devices. For example, the connection request broadcasted by second mobile device 210 will be received by fourth mobile device 220 and fifth mobile device 225. Similarly, the connection request broadcasted by third mobile device 215 will be received by fourth mobile device 220. In both cases, fourth mobile device 220 will then add its identifier to the connection requests it has received and will additionally broadcast these connection requests for receipt by further mobile devices. Finally, the connection requests broadcasted by fourth mobile device 220 will be received by both fifth mobile device 225 and sixth mobile device 230.

Both fifth mobile device 225 and sixth mobile device 230 are able to connect to server 125. Therefore, in response to receiving the various connection requests, each of the fifth mobile device 225 and the sixth mobile device 230 will add the identifier assigned to it to each of the connection requests it receives and will then convert the connection requests into connection path responses. Each of the connection path responses contains the path by which the connection request traveled from the first mobile device 205 to server 125 and indicates that a network connection to server 125 is available.

Once the fifth mobile device 225 and the sixth mobile device 230 have created the connection path responses from the connection requests they have received, the devices send the connection path responses back to first mobile device 205 along the same paths that the connection requests traveled from first mobile device 205 to fifth mobile device 225 or sixth mobile device 230. For example, consider the seventh possible connection path listed in FIG. 2B. As can be seen, sixth mobile device 230 received the connection request associated with this path from fourth mobile device 220. Therefore, sixth mobile device 230 sends the connection path response associated with this connection path to fourth mobile device 220. Once fourth mobile device 220 has received this connection request, it locates the identifier assigned to it in the connection path response and further locates the immediately preceding identifier in the connection path. Here, the immediately preceding identifier is assigned to third mobile device 215, indicating that fourth mobile device 220 received the connection path request associated with this connection path from third mobile device 215. Therefore, fourth mobile device 220 sends the connection path response to third mobile device 215. Finally, third mobile device 215 locates its assigned identifier in the connection path and, in a similar manner, discovers that it should send the connection path response to first mobile device 205. First mobile device 205 will receive all the possible connection paths available to server 125 through this process. First mobile device 205 will store these available connections as a connection map and use the connection map to determine one or more connection paths by which it can send data to server 125.

FIGS. 3A through 3D further illustrate the process by which the connection mesh illustrated in FIG. 2A is established, as well as the processes by which first mobile device 205 sends/receives data to/from server 125, focusing on the information sent and received by fourth mobile device 220.

Figure 3A:
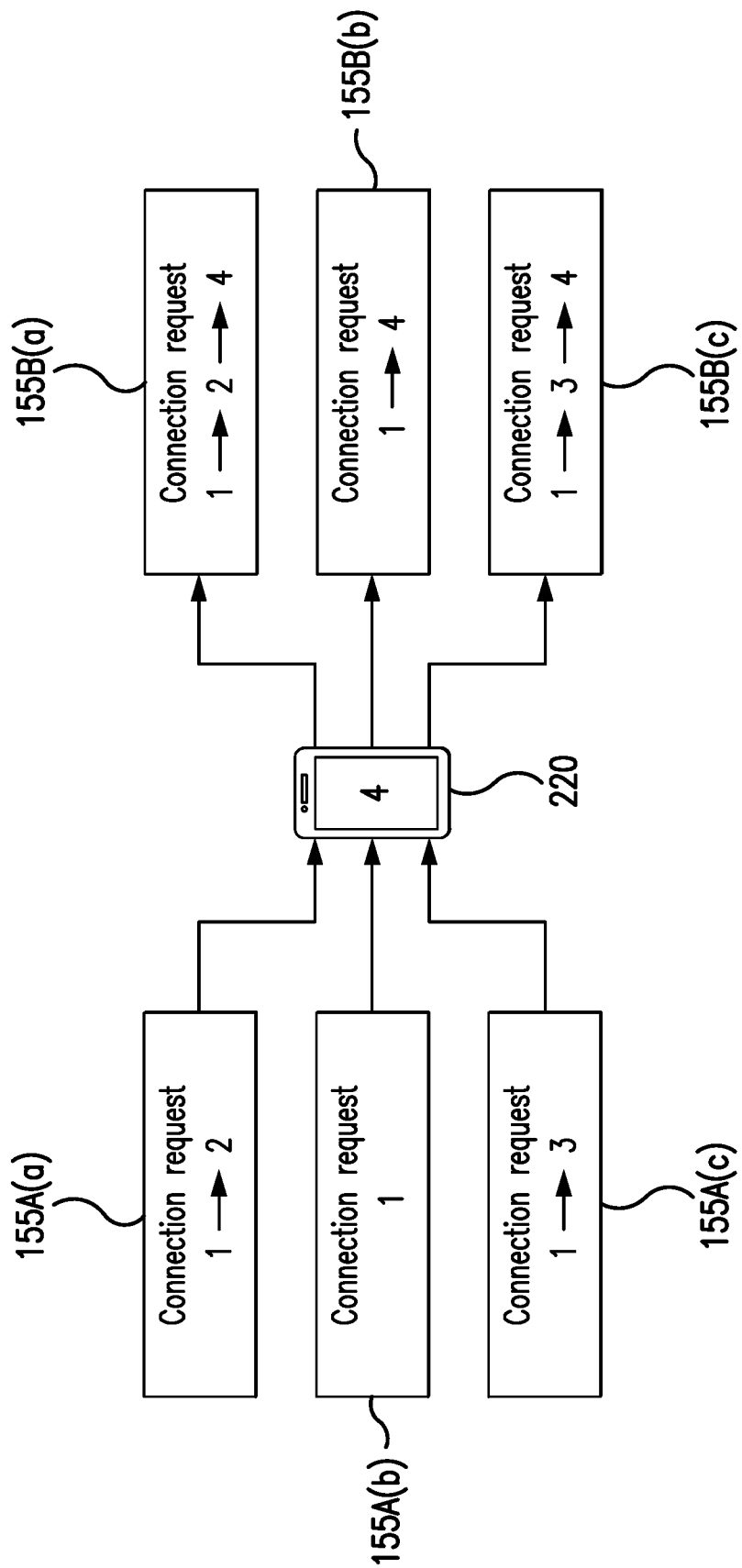

FIG. 3A first illustrates the information sent/received by fourth mobile device 220 in response to first mobile device 205 initially broadcasting a connection request. As can be seen from FIG. 2A, fourth mobile device 220 is within range to receive an NFC or BLE transmission from first mobile device 205, second mobile device 210, and third mobile device 215. Therefore, fourth mobile device 220 receives connection request 155A(a) (broadcasted from second mobile device 210 and containing a partial communication path from first mobile device 205 to second mobile device 210), connection request 155A(b) (broadcasted from first mobile device 205), and connection request 155A(c) (broadcasted from third mobile device 210 and containing a partial communication path from first mobile device 205 to third mobile device 210). Fourth mobile device 220 then adds the identifier assigned to it to the communication paths contained in the connection requests 155A(a) through 155A(c) and, given that fourth mobile device 220 is unable to connect to server 125, broadcasts these as connection requests 155B(a) through 155B(c) for receipt by nearby mobile devices.

As discussed above, in the discussion of FIGS. 2A through 2B, once mobile devices that are capable of connecting to server 125 have received the various connection requests, they will generate connection path responses from these connection requests, which they will then send back to first mobile device 205 along the paths taken by the connection requests they received, to inform first mobile device 205 that one or more connection paths to server 125 are available. In the example illustrated in FIG. 2A, fifth mobile device 225 and sixth mobile device 230 are able to connect to server 125.

Figure 3B:
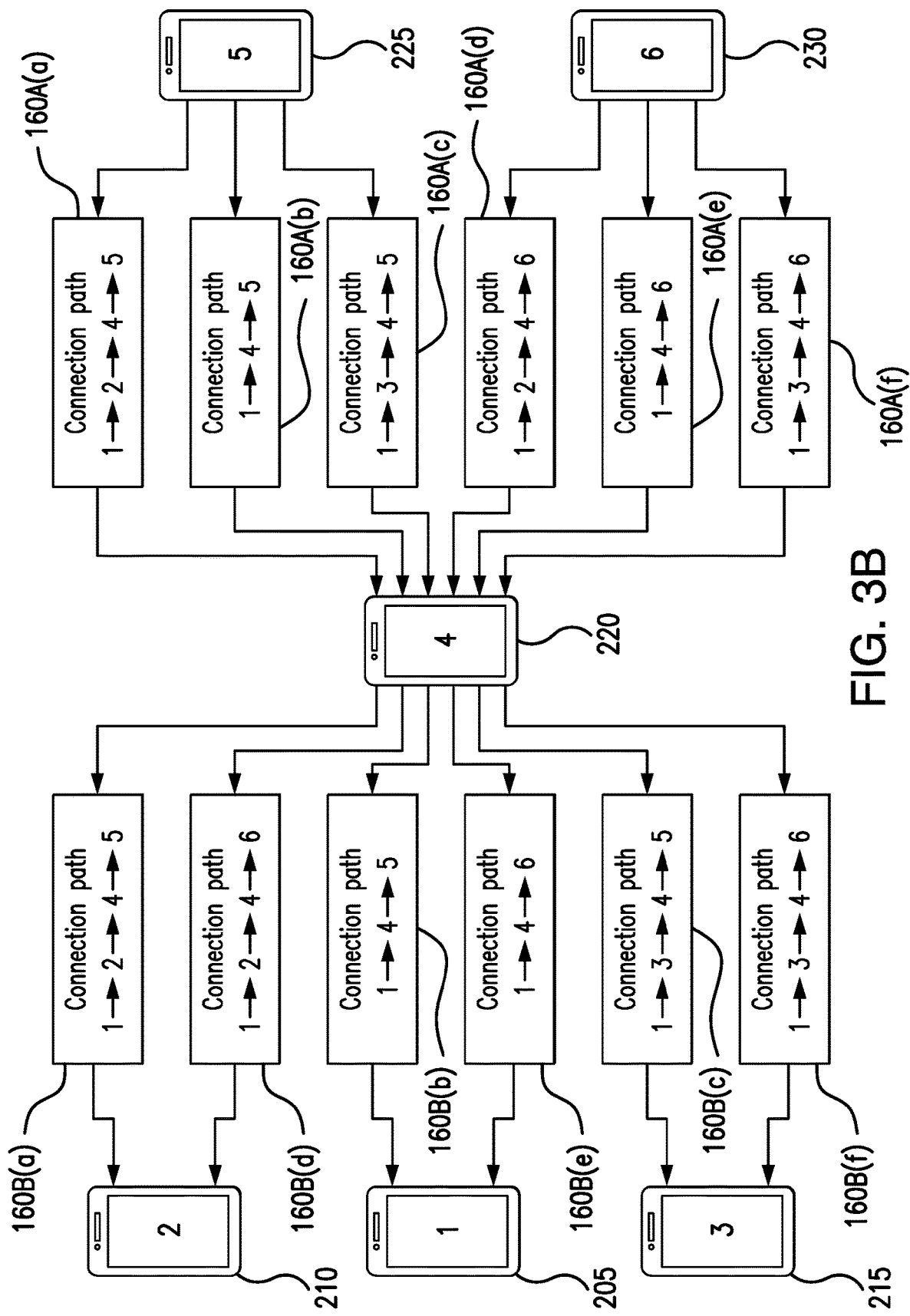

FIG. 3B illustrates the information sent/received by fourth mobile device 220 in response to fifth mobile device 225 and sixth mobile device 230 sending connection path responses back along the paths traveled by the connection requests they received. Here, since fifth mobile device 225 and sixth mobile device 230 each received all three connection requests 155B(a) through 155B(c) broadcasted by fourth mobile device 220, both fifth mobile device 225 and sixth mobile device 230 will send three connection path responses back to fourth mobile device 220. Fifth mobile device 225 sends connection path responses 160A(a) through 160A(c) to fourth mobile device 220 and sixth mobile device 230 sends connection path responses 160A(d) through 160A(f) to fourth mobile device 220.

When fourth mobile device 220 receives each of these connection path responses it first locates its assigned identifier in the connection path, and then locates the identifier immediately preceding its identifier in the connection path. Fourth mobile device 220 then uses this preceding identifier to determine the mobile device to which it should send the connection path response. For example, fourth mobile device 220 receives connection path response 160A(a), locates its identifier in this connection path, discovers that an identifier associated with second mobile device 210 precedes its identifier in the connection path, and therefore sends this connection path to second mobile device 210 as a first connection path response 160B(a). Similarly, fourth mobile device 220 sends connection path response 160B(b) to first mobile device 205, connection path response 160B(c) to third mobile device 215, connection path response 160B(d) to second mobile device 210, connection path response 160B(e) to first mobile device 205, and connection path response 160B(f) to third mobile device 215. Since both second mobile device 210 and third mobile device 215 received the initial connection requests from first mobile device 205, they will further send the connection path responses they receive to first mobile device 205. For example, second mobile device 210 will send connection path responses 160B(a) and 160B(d) to first mobile device 205 and third mobile device 215 will send connection path responses 160B(c) and 160B(f) to first mobile device 205. Once first mobile device 205 has received all of the connection path responses from the various mobile devices indicating that network connections to server 125 are available, it gathers together all available connection paths and stores them as a connection map. First mobile device 205 may then choose one or more of the available connection paths to send data to server 125.

FIG. 3C illustrates the information sent/received by fourth mobile device 220 in response to first mobile device 205 sending data 310 to server 125 along the fifth available connection path, illustrated in FIG. 2B. The fifth available connection path runs from first mobile device 205 to fourth mobile device 220 and finally to sixth mobile device 230, which is able to connect to server 125. Therefore, fourth mobile device 220 receives information packet 165A from first mobile device 205, containing data 310, map 315, and connection path 305, destined for server 125. Fourth mobile device 220 uses connection path 305 to determine to which mobile device it should send information packet 165A. To do this, fourth mobile device 220 first locates the identifier assigned to it in connection path 305, locates the following identifier in the connection path, and then determines the mobile device assigned to this following identifier, here sixth mobile device 230. Fourth mobile device 220 then sends information packet 165B to sixth mobile device 230. Since sixth mobile device 230 is the last mobile device in connection path 305, it will then send information packet 165B to server 125.

In certain situations, sixth mobile device 230 may be unable to send information packet 165B to server 125. For example, sixth mobile device 230 may move out of range of an NFC/BLE connection to fourth mobile device 220, such that sixth mobile device 230 does not receive information packet 165B, or sixth mobile device 230 may move out of range of a Wi-Fi or cellular data connection to server 125, such that sixth mobile device 230 is unable to send information packet 165B to server 125. This situation is illustrated in FIG. 3D.

FIG. 3D illustrates the information sent/received by fourth mobile device 220 in an embodiment in which sixth mobile device 230 is unable to send information packet 165B to server 125. In certain embodiments, fourth mobile device 220 may determine that sixth mobile device did not receive information packet 165B. In response, fourth mobile device 220 may use map 315 to determine an alternative connection path that does not include the identifier assigned to sixth mobile device 230. In this example, fourth mobile device 220 may determine that fourth possible connection path, illustrated in FIG. 2B, to server 125 exists, in which sixth mobile device 230 is replaced by fifth mobile device 225. Fourth mobile device 220 may then replace connection path 305 with this fourth possible connection path 320 and use this new connection path to send information packet 305 to fifth mobile device 225.

As discussed above, in the discussion of FIGS. 2A and 2B, first mobile device 205 may use a variety of different methods to choose the connection path by which to send data to server 125. For example, in certain embodiments, the communication path chosen for sending and receiving data between first mobile device 205 and server 125 is chosen by mobile network tool 105 at random. In certain such embodiments, the same communication path is used for the entire interaction between first mobile device 205 and server 125. In other such embodiments, a new random communication path is chosen for each transfer of data between first mobile device 205 and server 125. For example, first mobile device 205 may send a first piece of data to server 125 along the first possible communication path, illustrated in FIG. 2B, from first mobile device 205 to second mobile device 210, to fifth mobile device 225, which is able to send the first piece of data to server 125. In response to receiving this first piece of data, server 125 may send a second piece of data back to first mobile device 205 along the sixth possible communication path, illustrated in FIG. 2B, from server 125 to fifth mobile device 225 to fourth mobile device 220 to third mobile device 315, which is able to send the second piece of data to first mobile device 205.

In further embodiments, system 100 may use all available communication paths to send data between first mobile device 205 and server 125. This may be desirable to help ensure that data sent by first mobile device 205 is received by server 125 and data sent by server 125 is received by first mobile device 205.

Figure 4:
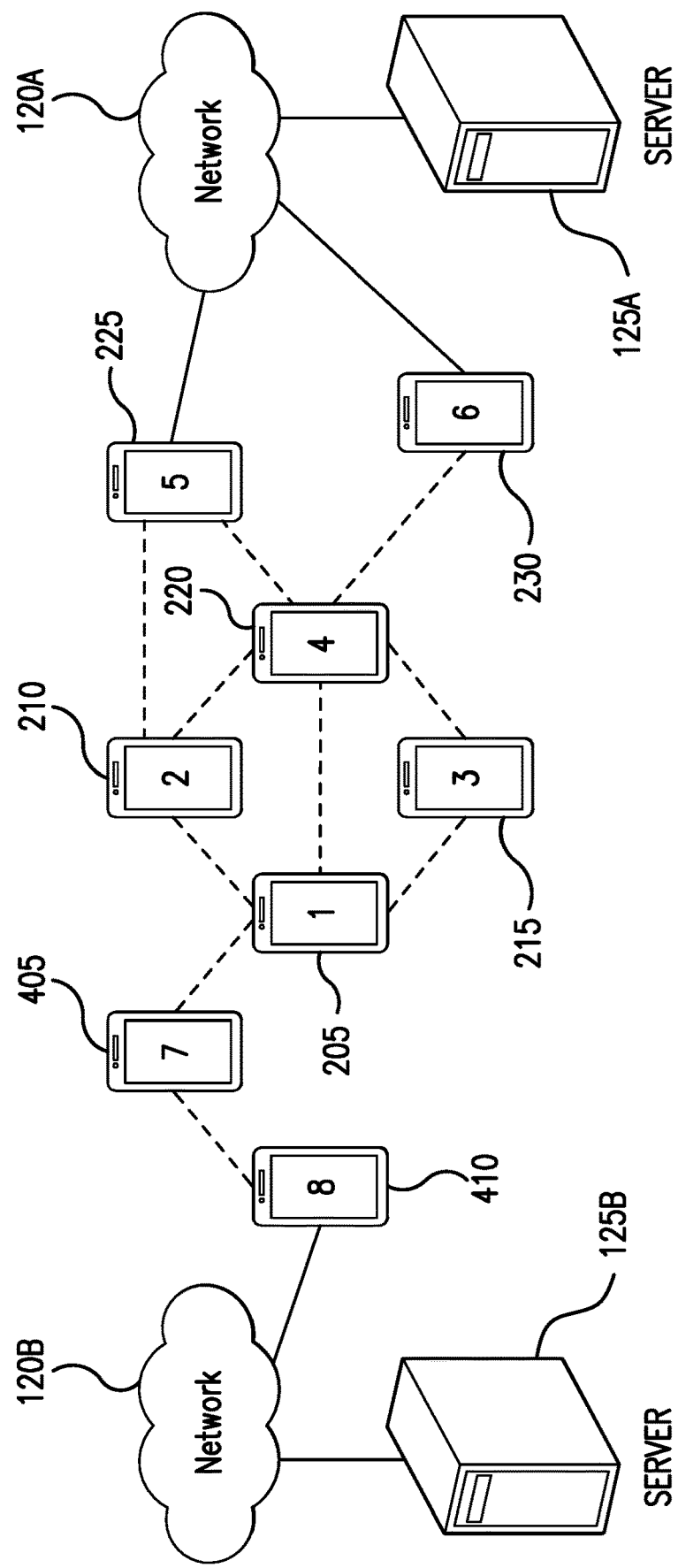
FIG. 4 illustrates an example embodiment of the system of FIG. 1, in which a mesh of eight mobile devices creates various communication paths to a network and which is used to explain how an optimal connection path is chosen by the system of FIG. 1.

In other embodiments, mobile network tool 105 may choose an optimal connection path from all available connection paths, where the optimal connection path is the path by which mobile device 205 can send/receive data to/from server 125 in the least possible time. In certain embodiments, mobile network tool 105 determines the optimal connection path based on the number of mobile devices contained in the available connection paths, the distances between each of the mobile devices in the available connection paths, and/or the distances between the mobile devices and the server in the available connection paths. For example, FIG. 4 illustrates an example embodiment of system 100 that includes a collection of eight mobile devices—first mobile device 205, second mobile device 210, third mobile device 215, fourth mobile device 220, fifth mobile device 225, sixth mobile device 230, seventh mobile device 405, and eighth mobile device 410—each containing mobile network tool 105. First mobile device 205 can either send data to server 125A along any of the seven possible connection paths illustrated in FIG. 2B, or it can send data to server 125B along a new connection path from first mobile device 205 to seventh mobile device 405 and finally to eighth mobile device 410 which is able to connect to server 125B.

In certain embodiments in which first mobile device 205 chooses an optimal connection path based on the number of devices in each of the possible connection paths, mobile device 205 with choose either the fourth possible connection path illustrated in FIG. 2B, from first mobile device 205 to fourth mobile device 220 and to fifth mobile device 225, the fifth possible connection path illustrated in FIG. 2B, from first mobile device 205 to fourth mobile device 220 and to sixth mobile device 230, or the new connection path from first mobile device 205 to seventh mobile device 405 and to eighth mobile device 410, as these three potential connection paths contain the fewest number of mobile devices. In other embodiments, in which the optimal connection path is chosen based on the distances between the mobile devices and the server 125, first mobile device 205 may choose the new connection path from first mobile device 205 to seventh mobile device 405 and to eighth mobile device 410 as the optimal connection path, because on average, the devices in this connection path are closer to server 125B than the remaining devices are to server 125A. In further embodiments, in which the optimal connection path is chosen based on both the number of devices in each of the possible connection paths and the distance between the mobile devices and the server 125, first mobile device 205 may again choose the new connection path from first mobile device 205 to seventh mobile device 405 and to eighth mobile device 410 as the optimal connection path, because it contains the fewest number of mobile devices and on average, the devices in this connection path are closer to server 125B than the remaining devices are to server 125. While in this example, the optimal connection path contains both the fewest number of mobile devices and devices that, one average, are closer to the server than devices in the remaining connection paths, this disclosure contemplates that optimal connection paths will exist that contain more mobile devices than other possible connection paths, but are nevertheless able to send data to server 125 in less time than the alternative connection paths containing fewer mobile devices.

Figure 5:
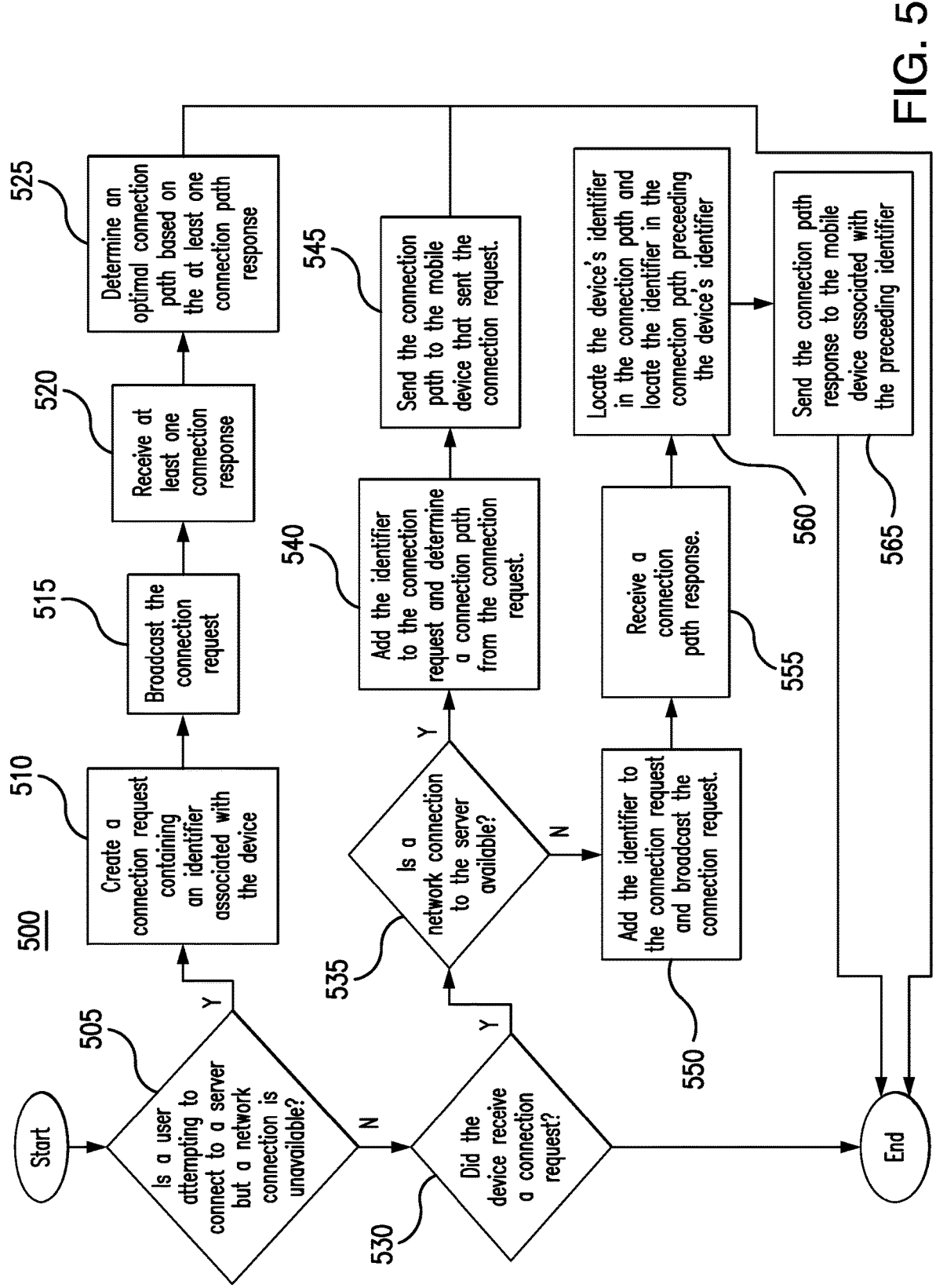
FIG. 5 presents a flowchart illustrating the process by which the system of FIG. 1 determines that one or more connection paths to a server are available.
Figure 6:
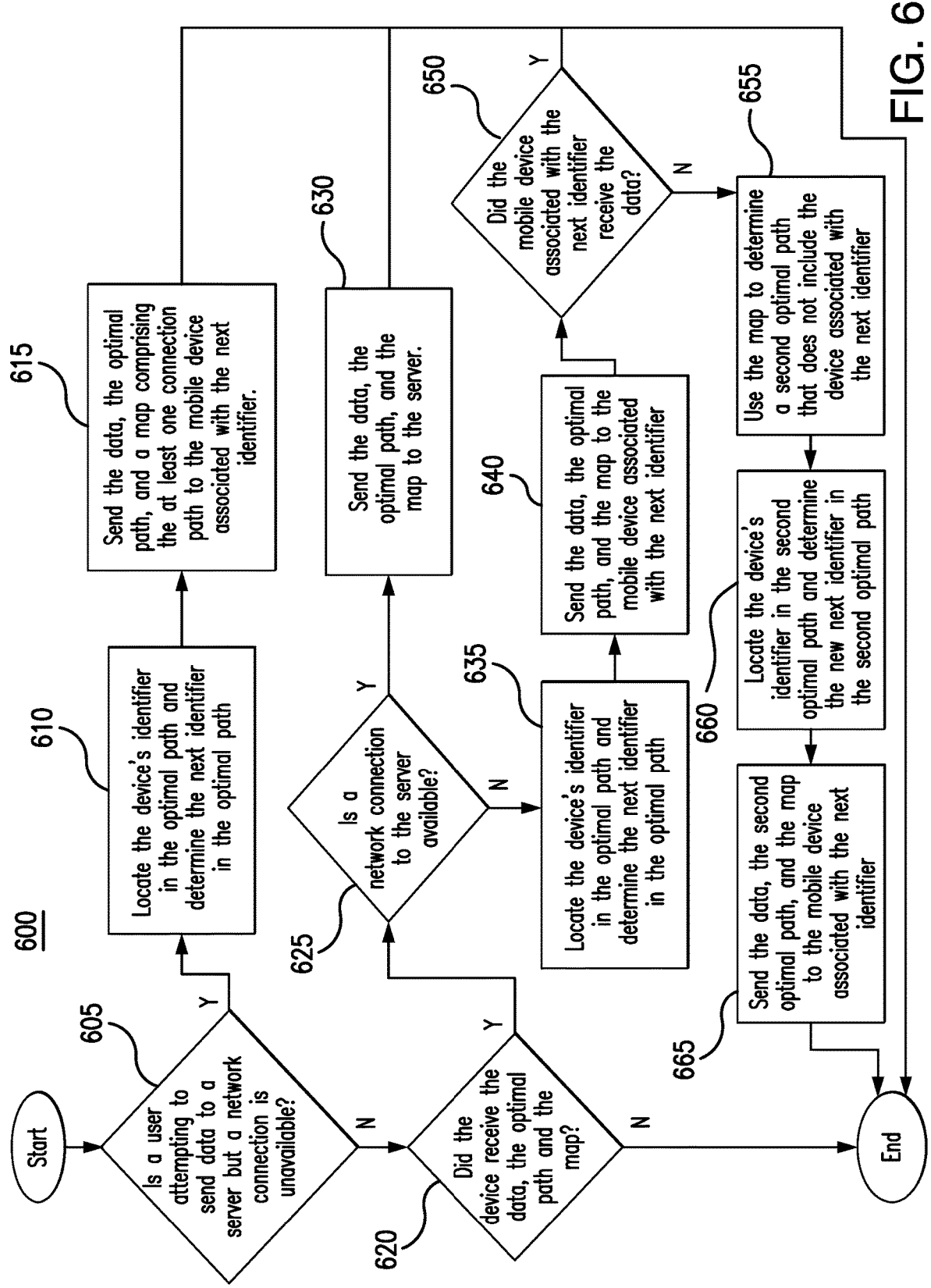
FIG. 6 presents a flowchart illustrating the process by which a mobile device in the system of FIG. 1 sends data to a server over one of the available connection paths.
Figure 7:
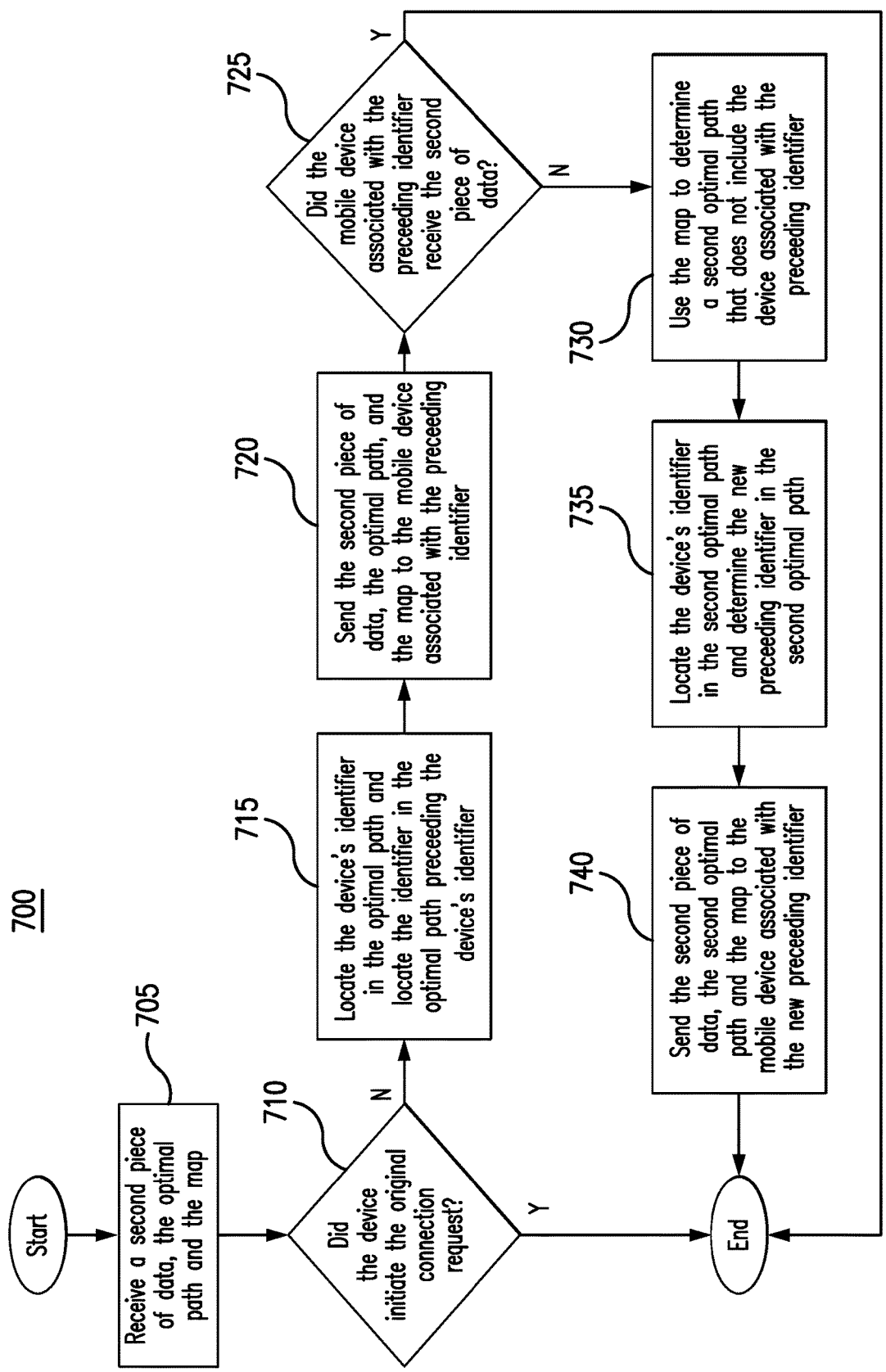
FIG. 7 presents a flowchart illustrating the process by which the server in the system of FIG. 1 sends data back to a mobile device over one of the available connection paths.

FIGS. 5 through 7 presents flowcharts illustrating the processes by which a mobile device of system 100 determines that one or more connection paths to a server are available, sends data to a server over one of the available connection paths, and receives data back from the server over one of the available connection paths.

FIG. 5 presents a flowchart illustrating the process by which a connection mesh, such as the one illustrated in FIG. 2A is established by system 100. In step 505, a mobile device first determines if a user 110 of the device is attempting to connect to a server 125 and that a connection to server 125 over network 120 is unavailable. In response to determining that a user 110 of the device is attempting to connect to a server 125 and that a connection to server 125 over network 120 is unavailable, the device next it creates a connection request containing an identifier associated with the device in step 510, and broadcasts this connection request using LTE or BLE in step 515. Once it has finished broadcasting the request, the mobile device waits to receive responses from nearby mobile devices indicating that a network connection to the server is available through one or more connection paths formed by the nearby mobile devices. In step 520, the mobile device receives at least one such connection path response, which consists of the identifiers of all the mobile devices that make up the available connection path. In step 525, the mobile device stores all of the available connection paths it has received, as a connection map, and determines one or more available connection paths (illustrated here as the "optimal connection path") along which to send data to server 125.

If, in step 505, the mobile device determines that a user of the device is not attempting to connect to a server 125, then, in step 530, it next determines if the device received a connection request from a nearby mobile device. If the device determines that it did receive a connection request, then in step 535 the device next determines if a network connection to server 125 is available. If the device determines that a network connection to server 125 is available, then in step 540, the device adds its assigned identifier to the connection request that it received and uses this connection request to form a connection path response, which it then sends back to the mobile device from which it received the connection request, in step 545.

If, in step 535, the mobile device determines that a network connection to server 125 is not available, then in step 550, the mobile device adds its assigned identifier to the connection request and broadcasts this connection request for receipt by nearby mobile devices. The mobile device then waits for a connection path response, which it receives in step 545. The device then locates its assigned identifier in the connection path response, and further locates the identifier in the connection path that precedes its identifier, in step 560. It uses this preceding identifier to determine the mobile device from which it received the connection request, and to which it should send the connection path response. It then sends the connection path response to this mobile device in step 565.

By following the steps of method 500, a collection of mobile devices is able to provide a set of possible connection paths between a mobile device and server 125, to the mobile device, where the mobile device is unable to directly connect to server 125 over network 120.

Modifications, additions, or omissions may be made to method 500 depicted in FIG. 5. Method 500 may include more, fewer, or other steps. For example, steps may be performed in parallel or in any suitable order. While discussed as system 100 (or components thereof) performing the steps, any suitable component of system 100 may perform one or more steps of the method.

FIG. 6 illustrates the process by which a mobile device of system 100 sends a first piece of data to server 125 over a connection path chosen from the connection paths received using method 500. In this figure, the chosen connection path is labelled as the "optimal path." This disclosure contemplates that this chosen connection path may be chosen according to a variety of different criteria, as described above in the discussion of FIGS. 2A and 2B.

In step 605, the mobile device first determines if a user of the device is attempting to send a first piece of data to server 125, but that a connection to network 120 is unavailable (i.e. the device determines if it sent the original connection request). If the user of the device is attempting to send the first piece of data to server 125, then, in step 610, the device locates its identifier in the optimal path and further determines the following identifier in the optimal path. In step 615, the mobile device next sends the first piece of data, the optimal path, and a map containing at least one connection path to the mobile device assigned to the next identifier. In certain embodiments, the device first encrypts the first piece of data, prior to sending it.

Alternatively, if, in step 605, the device determines that a user is not attempting to send the first piece of data to server 125, then, in step 620, the device next determines if it has received a first piece of data, an optimal path, and a map from a nearby mobile device. If the device did receive a first piece of data, an optimal path, and a map from a nearby mobile device, in step 625, it next determines whether it is able to connect to network 120. If the device is able to connect to network 120, then in step 630, it sends the first piece of data, the optimal path, and the map to server 125 over network 120.

If, in step 625, the device determines that it is unable to connect to network 120, then in step 635, it locates its assigned identifier in the optimal path and determines the next identifier in the sequence of identifiers in that optimal path. In step 640, it then sends the first piece of data, the optimal path, and the map to the mobile device assigned to that next identifier. In step 650, it next determines whether the mobile device assigned to that next identifier received the first piece of data. If the mobile device assigned to the next identifier did not receive the first piece of data, then in step 655, the mobile device uses the map it received to determine a second optimal path to server 125 that does not include the device assigned to the next identifier. In step 660, the device locates its assigned identifier in the second optimal path and determines the new next identifier following its assigned identifier in the second optimal path. In step 665, it then sends the first piece of data, the optimal path, and the map to the mobile device assigned to the new next identifier. In this manner, the mobile device that initiated the connection request is then able to send a first piece of data to server 125 through a network of cooperating mobile devices.

Modifications, additions, or omissions may be made to method 600 depicted in FIG. 6. Method 600 may include more, fewer, or other steps. For example, steps may be performed in parallel or in any suitable order. While discussed as system 100 (or components thereof) performing the steps, any suitable component of system 100 may perform one or more steps of the method.

FIG. 7 illustrates the process by which a mobile device of system 100 that initiated a connection request receives data back from server 125 over one of the available connection paths. In step 705, a mobile device receives a second piece of data, an optimal path, and a map containing at least one connection path. In step 710, the device determines if it sent the original connection request. If the device did not send the initial connection request, then, in step 715, the device locates its assigned identifier in the optimal path and further locates the preceding identifier in the sequence of identifiers in that optimal path. In step 720, the device sends the second piece of data, the optimal path, and the map to the mobile device assigned to the preceding identifier.

Next, in step 725, the device determines if the mobile device assigned to the preceding identifier received the second piece of data. If the mobile device assigned to the preceding identifier did not receive the second piece of data, then in step 730, the device uses the map to determine a second optimal path that does not include the device assigned to the preceding identifier. In step 735, the device locates its assigned identifier in the second optimal path and determines the new preceding identifier in the second optimal path. Finally, in step 740, the device sends the second piece of data, the second optimal path, and the map to the mobile device assigned to the new preceding identifier. In this manner, the mobile device that initiated the connection request is then able to receive a second piece of data from server 125 through a network of cooperating mobile devices. In certain embodiments, if the device determines that it did initiate the connection request, it further decrypts the second piece of data.

Modifications, additions, or omissions may be made to method 700 depicted in FIG. 7. Method 700 may include more, fewer, or other steps. For example, steps may be performed in parallel or in any suitable order. While discussed as system 100 (or components thereof) performing the steps, any suitable component of system 100 may perform one or more steps of the method.

Figure 8:
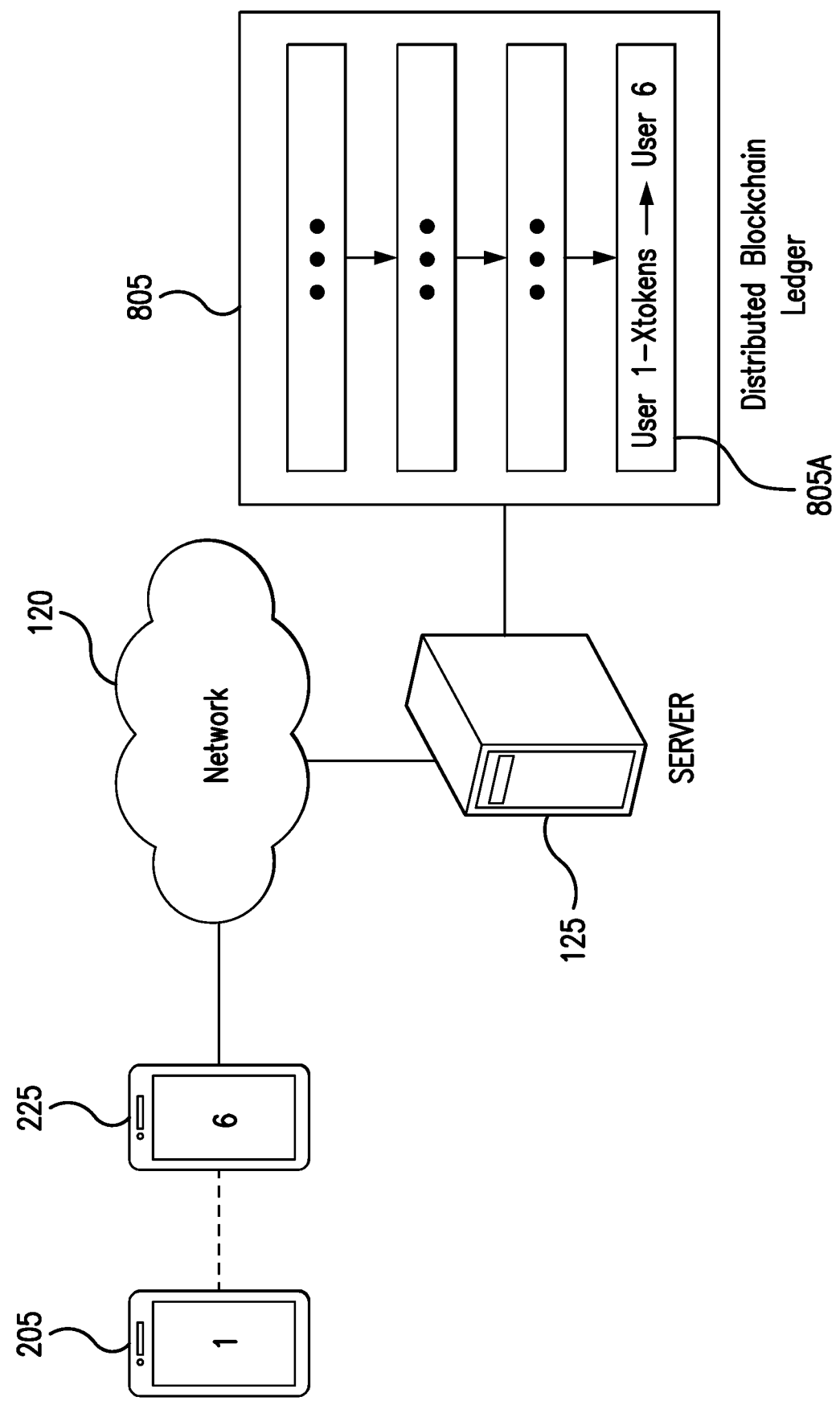
FIG. 8 illustrates the use of a blockchain ledger in the system of FIG. 1 to reimburse the user of a mobile device with direct access to a network for network resources provided by it to a user of a mobile device without direct access to the network.

FIGS. 1 through 7 illustrate the process by which a mesh of mobile devices can cooperate with one another to provide a mobile device that is unable to connect to network 120 with a connection to the network. In order to provide such a connection, a terminating mobile device, in a chain of mobile devices, that is able to connect to network 120 shares its connection with the first mobile device, in the chain of mobile devices, that is unable to connect to network 120. Given that the terminating mobile device that shares its network connection may incur network data charges as a result of data sent to and received by server 125 over network 120, it may be desirable to implement a process for transferring such charges from the terminating mobile device to the first mobile device. FIG. 8 illustrates one such process.

FIG. 8 illustrates the use of a distributed blockchain ledger 805 to track which mobile device in a chain of cooperating mobile devices actually used the network resources accessed by the terminating mobile device in the chain. For simplicity, FIG. 8 illustrates a chain consisting of only two mobile devices; however, this disclosure contemplates the use of a blockchain ledger 805 with a mesh of interconnected mobile devices of any size.

In certain embodiments, prior to a terminating mobile device 225 accessing network resources on behalf of a first mobile device 205, mobile network tool 105 first presents the user of first mobile device 205 with a contract. In certain embodiments, this contract consists of a price per data unit transferred to/from network 120. This disclosure contemplates that the price per data unit may be variable and may depend on the number of mobile devices included in the connection path from first mobile device 205 to terminating mobile device 225, the size of the data packets transferred, and the direction of transfer (i.e. from network 120 or to network 120), among other factors. If the user of first mobile device 205 accepts the contract and transfers data to/from network 120, mobile network tool 105 records this transaction in distributed blockchain ledger 805.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A device comprising:
a memory;
a transceiver;
a hardware processor communicatively coupled to the memory, the hardware processor configured to:
receive using the transceiver a first connection request broadcasted from a first mobile device, the first connection request comprising a first identifier assigned to the first mobile device;
in response to receiving the first connection request:
determine that a network connection to a server is not available;
in response to determining that the network connection to the server is not available:
add a second identifier to the first connection request;
broadcast using the transceiver the first connection request for receipt by at least one mobile device;
in response to broadcasting the first connection request:
receive using the transceiver a first connection path from a second mobile device, the first connection path comprising the first identifier, the second identifier, and a third identifier assigned to the second mobile device; and
send using the transceiver the first connection path to the first mobile device;
receive using the transceiver a first piece of data and a second connection path from the first mobile device, the second connection path comprising the first identifier, the second identifier, and a fourth identifier assigned to a third mobile device; and
in response to receiving the first piece of data and the second connection path:
identify the third mobile device, based on the second connection path and the fourth identifier; and send using the transceiver the first piece of data and the second connection path to the third mobile device.

2. The device of claim 1, wherein the processor is further configured to:
determine that a user of the device is attempting to connect to the server and that the network connection to the server is unavailable;
in response to determining that the user of the device is attempting to connect to the server and the network connection to the server is unavailable:
broadcast using the transceiver a second connection request for receipt by the at least one mobile device, the second connection request comprising the second identifier;
receive using the transceiver at least one connection path, each connection path of the at least one connection path comprising the second identifier, a fifth identifier, and a sixth identifier, the fifth identifier assigned to a fourth mobile device that received the second connection request from the device and the sixth identifier assigned to a fifth mobile device that is connected to a network;
determine, using each connection path of the at least one connection path, based in part on a number of identifiers in each connection path of the at least one connection path, an optimal connection path comprising the second identifier, a seventh identifier, and an eighth identifier, the seventh identifier assigned to a sixth mobile device that received the second connection request from the device and the eighth identifier assigned to a seventh mobile device that is connected to the network;
determine, based on the at least one connection path, a connection map comprising each connection path of the at least one connection path; and
send using the transceiver, a second piece of data, the connection map, and the optimal connection path to the sixth mobile device.

3. The device of claim 2, wherein the processor is further configured to:
in response to determining that the user of the mobile device is attempting to connect to the server and that the network connection to the server is unavailable, and further in response to sending the second piece of data, the connection map, and the optimal connection path to the sixth mobile device:
determine that the sixth mobile device did not receive the second piece of data;
determine that the connection map contains a third connection path different from the optimal connection path, the third connection path comprising the second identifier, a ninth identifier, and a tenth identifier, the ninth identifier assigned to an eighth mobile device that received the second connection request, the eighth mobile device different from the sixth mobile device, and the tenth identifier assigned to a ninth mobile device that is connected to the network; and
send using the transceiver the second piece of data, the connection map, and the third connection path to the eighth mobile device.

4. The device of claim 2, wherein determining the optimal connection path is further based on a set of distances comprising a first set of distances between each mobile device of the at least one mobile device and the device, and a second set of distances between each mobile device of the at least one mobile device and every other mobile device of the at least one mobile device.

5. The device of claim 2, wherein determining the optimal connection path comprises determining that the server will receive the second piece of data in less time using the optimal path than if the device sent the second piece of data using any other connection path of the at least one connection path.

6. The device of claim 1, wherein the processor is further configured to:
determine that the network connection to the server is available; and
in response to determining that the network connection to the server is available:
add the second identifier to the first connection request;
determine a third connection path, based on the first connection request; and
send using the transceiver the third connection path to the first mobile device.

7. The device of claim 6, wherein the processor is further configured to:
in response to determining that the network connection to the server is available and further in response to sending the third connection path to the first mobile device:
receive using the transceiver a third piece of data and a fourth connection path from the first mobile device; and
send the third piece of data and the fourth connection path to the server over the network.

8. A method comprising:
receiving using a transceiver a first connection request broadcasted from a first mobile device, the first connection request comprising a first identifier assigned to the first mobile device;
in response to receiving the first connection request:
determining that a network connection to a server is not available;
in response to determining that the network connection to the server is not available:
adding a second identifier to the first connection request;
broadcasting using the transceiver the first connection request for receipt by at least one mobile device;
in response to broadcasting the first connection request:
receiving using the transceiver a first connection path from a second mobile device, the first connection path comprising the first identifier, the second identifier, and a third identifier assigned to the second mobile device; and
sending using the transceiver the first connection path to the first mobile device;
receiving using the transceiver a first piece of data and a second connection path from the first mobile device, the second connection path comprising the first identifier, the second identifier, and a fourth identifier assigned to a third mobile device; and
in response to receiving the first piece of data and the second connection path:
identifying the third mobile device, based on the second connection path and the fourth identifier; and
sending using the transceiver the first piece of data and the second connection path to the third mobile device.

9. The method of claim 8, further comprising:
determining that a user of the device is attempting to connect to the server and that the network connection to the server is unavailable;
in response to determining that the user of the device is attempting to connect to the server and the network connection to the server is unavailable:
broadcasting using the transceiver a second connection request for receipt by the at least one mobile device, the second connection request comprising the second identifier;
receiving using the transceiver at least one connection path, each connection path of the at least one connection path comprising the second identifier, a fifth identifier, and a sixth identifier, the fifth identifier assigned to a fourth mobile device that received the second connection request from the device and the sixth identifier assigned to a fifth mobile device that is connected to a network;
determining, using each connection path of the at least one connection path, based in part on a number of identifiers in each connection path of the at least one connection path, an optimal connection path comprising the second identifier, a seventh identifier, and an eighth identifier, the seventh identifier assigned to a sixth mobile device that received the second connection request from the device and the eighth identifier assigned to a seventh mobile device that is connected to the network;
determining, based on the at least one connection path, a connection map comprising each connection path of the at least one connection path; and
sending using the transceiver, a second piece of data, the connection map, and the optimal connection path to the sixth mobile device.

10. The method of claim 9, further comprising:
in response to determining that the user of the mobile device is attempting to connect to the server and that the network connection to the server is unavailable, and further in response to sending the second piece of data, the connection map, and the optimal connection path to the sixth mobile device:
determining that the sixth mobile device did not receive the second piece of data;
determining that the connection map contains a third connection path different from the optimal connection path, the third connection path comprising the second identifier, a ninth identifier, and a tenth identifier, the ninth identifier assigned to an eighth mobile device that received the second connection request, the eighth mobile device different from the sixth mobile device, and the tenth identifier assigned to a ninth mobile device that is connected to the network; and
sending using the transceiver the second piece of data, the connection map, and the third connection path to the eighth mobile device.

11. The method of claim 9, wherein determining the optimal connection path is further based on a set of distances comprising a first set of distances between each mobile device of the at least one mobile device and the device, and a second set of distances between each mobile device of the at least one mobile device and every other mobile device of the at least one mobile device.

12. The method of claim 9, wherein determining the optimal connection path comprises determining that the server will receive the second piece of data in less time using the optimal path than if the device sent the second piece of data using any other connection path of the at least one connection path.

13. The method of claim 8, further comprising:
determining that the network connection to the server is available; and
in response to determining that the network connection to the server is available:
adding the second identifier to the first connection request;
determining a third connection path, based on the first connection request; and
sending using the transceiver the third connection path to the first mobile device.

14. The method of claim 13, further comprising:
in response to determining that the network connection to the server is available and further in response to sending the third connection path to the first mobile device:
receiving using the transceiver a third piece of data and a fourth connection path from the first mobile device; and
sending the third piece of data and the fourth connection path to the server over the network.

15. A system comprising:
a storage element;
a transceiver;
a processing element communicatively coupled to the memory, the processing element operable to:
receive using the transceiver a first connection request broadcasted from a first mobile device, the first connection request comprising a first identifier assigned to the first mobile device;
in response to receiving the first connection request:
determine that a network connection to a server is not available;
in response to determining that the network connection to the server is not available:
add a second identifier to the first connection request;
broadcast using the transceiver the first connection request for receipt by at least one mobile device;
in response to broadcasting the first connection request:
receive using the transceiver a first connection path from a second mobile device, the first connection path comprising the first identifier, the second identifier, and a third identifier assigned to the second mobile device; and
send using the transceiver the first connection path to the first mobile device;
receive using the transceiver a first piece of data and a second connection path from the first mobile device, the second connection path comprising the first identifier, the second identifier, and a fourth identifier assigned to a third mobile device; and
in response to receiving the first piece of data and the second connection path:
identify the third mobile device, based on the second connection path and the fourth identifier; and
send using the transceiver the first piece of data and the second connection path to the third mobile device.

16. The system of claim 15, wherein the processing element is further operable to:

determine that a user of the device is attempting to connect to the server and that the network connection to the server is unavailable;

in response to determining that the user of the device is attempting to connect to the server and the network connection to the server is unavailable:

broadcast using the transceiver a second connection request for receipt by the at least one mobile device, the second connection request comprising the second identifier;

receive using the transceiver at least one connection path, each connection path of the at least one connection path comprising the second identifier, a fifth identifier, and a sixth identifier, the fifth identifier assigned to a fourth mobile device that received the second connection request from the device and the sixth identifier assigned to a fifth mobile device that is connected to a network;

determine, using each connection path of the at least one connection path, based in part on a number of identifiers in each connection path of the at least one connection path, an optimal connection path comprising the second identifier, a seventh identifier, and an eighth identifier, the seventh identifier assigned to a sixth mobile device that received the second connection request from the device and the eighth identifier assigned to a seventh mobile device that is connected to the network, wherein determining the optimal connection path comprises determining that the server will receive the second piece of data in less time using the optimal path than if the device sent the second piece of data using any other connection path of the at least one connection path;

determine, based on the at least one connection path, a connection map comprising each connection path of the at least one connection path; and send using the transceiver, a second piece of data, the connection map, and the optimal connection path to the sixth mobile device.

17. The system of claim 16, wherein the processing element is further operable to:

in response to determining that the user of the mobile device is attempting to connect to the server and that the network connection to the server is unavailable, and further in response to sending the second piece of data, the connection map, and the optimal connection path to the sixth mobile device:

determine that the sixth mobile device did not receive the second piece of data;

determine that the connection map contains a third connection path different from the optimal connection path, the third connection path comprising the second identifier, a ninth identifier, and a tenth identifier, the ninth identifier assigned to an eighth mobile device that received the second connection request, the eighth mobile device different from the sixth mobile device, and the tenth identifier assigned to a ninth mobile device that is connected to the network; and send using the transceiver the second piece of data, the connection map, and the third connection path to the eighth mobile device.

18. The system of claim 16, wherein determining the optimal connection path is further based on a set of distances comprising a first set of distances between each mobile device of the at least one mobile device and the device, and a second set of distances between each mobile device of the at least one mobile device and every other mobile device of the at least one mobile device.

19. The system of claim 15, wherein the processing element is further operable to:

determine that the network connection to the server is available; and in response to determining that the network connection to the server is available:

add the second identifier to the first connection request;

determine a third connection path, based on the first connection request; and send using the transceiver the third connection path to the first mobile device.

20. The system of claim 19, wherein the processing element is further operable to:

in response to determining that the network connection to the server is available and further in response to sending the third connection path to the first mobile device:

receive using the transceiver a third piece of data and a fourth connection path from the first mobile device; and send the third piece of data and the fourth connection path to the server over the network.

* * * * *